(12) United States Patent
Zhao et al.

(10) Patent No.: US 11,516,508 B2
(45) Date of Patent: *Nov. 29, 2022

(54) METHOD AND APPARATUS FOR VIDEO CODING

(71) Applicant: TENCENT AMERICA LLC, Palo Alto, CA (US)

(72) Inventors: Xin Zhao, Santa Clara, CA (US); Xiang Li, Saratoga, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/469,815

(22) Filed: Sep. 8, 2021

(65) Prior Publication Data

US 2021/0409762 A1   Dec. 30, 2021

Related U.S. Application Data

(63) Continuation of application No. 16/827,248, filed on Mar. 23, 2020, now Pat. No. 11,317,116.

(60) Provisional application No. 62/824,019, filed on Mar. 26, 2019.

(51) Int. Cl.
*H04N 19/593* (2014.01)
*H04N 19/176* (2014.01)
*H04N 19/184* (2014.01)
*H04N 19/96* (2014.01)

(52) U.S. Cl.
CPC ......... *H04N 19/593* (2014.11); *H04N 19/176* (2014.11); *H04N 19/184* (2014.11); *H04N 19/96* (2014.11)

(58) Field of Classification Search
CPC .. H04N 19/176; H04N 19/184; H04N 19/593; H04N 19/96; H04N 19/122; H04N 19/157; H04N 19/463; H04N 19/70
See application file for complete search history.

(56) References Cited

U.S. PATENT DOCUMENTS

2012/0177116 A1* 7/2012 Panusopone ......... H04N 19/122
375/240.12

OTHER PUBLICATIONS

A. Fuldseth et al., "Transform design for HEVC with 16 bit intermediate data representation", Joint Collaborative Team on Video Coding (JCT-VC) of ITU-I SG16 WP3 and ISO/IEC JTC1/SC29/WG11, JCTVC-E-243, 5th Meeting: Geneva, CH, Mar. 16-23, 2011 (16 pages).

* cited by examiner

*Primary Examiner* — Dakshesh D Parikh
(74) *Attorney, Agent, or Firm* — ArentFox Schiff LLP

(57) ABSTRACT

Aspects of the disclosure provide methods and apparatuses for video encoding/decoding. In some examples, an apparatus for video encoding includes processing circuitry. The processing circuitry determines a maximum transform size for partitioning a block in a coding tree unit (CTU) based on a size of the CTU. Then, the processing circuitry partitions the block into one or more transform blocks based on the maximum transform size, and encodes residues associated with a prediction of the block into bits in a bitstream, according to the one of more transform blocks.

20 Claims, 45 Drawing Sheets

4x4 transform

8x8 transform

16x16 transform

{ ck, -cj, ci, -ch, cg, -cf, ce, -cd, cc, -cb, ca, -bz, by, -bv, bu, -ht, bs, -br, bq, -bp, bo, -bn, bm, -bl,
bk, -bj, bi, -bh, bg, -bf, bf, -bg, bj, -bi, bj, -bk, bl, -bm, bn, -bo, bp, -bg, br, -bs, bt, -bu, bv, -by, bz,
-ca, cb, -cc, cd, -ce, cf, -cg, ch, -ci, cj, -ck } where

Transform basis functions of DCT-2, DST-7 and DCT-8 for N-point input

| Transform Type | Basis function $T_i(j)$, $i,j=0, 1,..., N-1$ |
|---|---|
| DCT-2 | $T_i(j) = \omega_0 \cdot \sqrt{\dfrac{2}{N}} \cdot \cos\left(\dfrac{\pi \cdot i \cdot (2j+1)}{2N}\right)$<br>where $\omega_0 = \begin{cases} \sqrt{\dfrac{2}{N}} & i=0 \\ 1 & i \neq 0 \end{cases}$ |
| DCT-8 | $T_i(j) = \sqrt{\dfrac{4}{2N+1}} \cdot \cos\left(\dfrac{\pi \cdot (2i+1) \cdot (2j+1)}{4N+2}\right)$ |
| DST-7 | $T_i(j) = \sqrt{\dfrac{4}{2N+1}} \cdot \sin\left(\dfrac{\pi \cdot (2i+1) \cdot (j+1)}{2N+1}\right)$ |

FIG. 14

| mts_idx | Transform Type Horizontal | Transform type Vertical |
|---|---|---|
| −1 | 0 | 0 |
| 0 | 1 | 1 |
| 1 | 2 | 1 |
| 2 | 1 | 2 |
| 3 | 2 | 2 |

1500, 1501, 1502, 1503, 1504, 1505

Transform Type
0 – DCT2
1 – DST7
2 – DCT8

*FIG. 15*

4-point DST-7:

{ a, b, c, d }
{ c, c, 0, -c }
{ d, -a, -c, b }
{ b, -d, c, -a } where {a, b, c, d} = { 29, 55, 74, 84}

FIG. 16

8-point DST-7:

{ a,  b,  c,  d,  e,  f,  g,  h,}
{ c,  f,  h,  e,  b, -a, -d, -g,}
{ e,  g,  b, -c, -h, -d,  a,  f,}
{ g,  c, -d, -f,  a,  h,  b, -e,}
{ h, -a, -g,  b,  f, -c, -e,  d,}
{ f, -e, -a,  g, -d, -b,  h, -c,}
{ d, -h,  e, -a, -c,  g, -f,  b,}
{ b, -d,  f, -h,  g, -e,  c, -a,} where {a, b, c, d, e, f, g, h} = {17, 32, 46, 60, 71, 78, 85, 86}

FIG. 17

16-point DST-7:

{ a,  b,  c,  d,  e,  f,  g,  h,  i,  j,  k,  l,  m,  n,  o,  p },
{ c,  f,  i,  l,  o, -p, -m, -j, -g, -d, -a, -b, -e, -h, -k, -n },
{ e,  j,  o, -m, -h, -c, -b, -g, -l, -p, -k, -f, -a, -d, -i, -n },
{ g,  n, -l, -e, -i, -p,  j,  c,  k, -h, -a, -m,  f,  o, -d, -b },
{ i,  o, -f, -c, -l,  l,  c,  f, -o, -i,  o,  f,  c,  l, -l, -c }   [partially unreadable]
{ k,  k, -k, -k,  k,  k, -k, -k,  k,  k, -k, -k,  k,  k, -k, -k },
{ m,  g, -p, -a, -l,  h,  o,  b, -k, -i, -n,  c,  j, -d, -p, -e }   [partially unreadable]
{ o,  c, -l, -f,  i,  i, -f, -l,  c,  o,  a,  p,  b,  m,  e,  j }   [partially unreadable]
{ p, -a, -o,  b,  n, -c, -m,  d,  l, -e, -k,  f,  j, -g, -i,  h },
{ n, -e, -i,  j,  d, -o,  a,  m, -f, -h,  k,  c, -p,  b,  l, -g },
{ l, -i, -c,  o, -f, -f,  o, -c, -i,  l,  o,  l, -i, -c,  o, -f }   [partially unreadable]
{ j, -m,  c,  g, -p,  f,  d, -n,  i,  a, -k,  l, -b, -h,  o, -e },
{ h, -p,  i, -a, -g,  o, -j,  b,  f, -n,  k, -c, -e,  m, -l,  d },
{ f, -l,  o, -i,  c,  c, -i,  o, -l,  f,  a, -d,  g, -j,  m, -p }   [partially unreadable]
{ d, -h,  l, -p,  m, -i,  e, -a, -c,  g, -k,  o, -n,  j, -f,  b },
{ b, -d,  f, -h,  j, -l,  n, -p,  o, -m,  k, -i,  g, -e,  c, -a }, where {a, b, c, d, e, f, g, h, i, j, k, l, m, n, o, p} = { 9, 17, 25, 33, 41, 49, 56, 62, 66, 72, 77, 81, 83, 87, 89, 90}

*FIG. 18*

32-point DST-7:

[figure content - matrix of coefficients]

where {a, b, c, d, e, f, g, h, i, j, k, l, m, n, o, p, q, r, s, t, u, v, w, x, y, z, A, B, C, D, E, F} = { 4, 9, 13, 17, 21, 26, 30, 34, 38, 42, 45, 50, 53, 56, 60, 63, 66, 68, 72, 74, 77, 78, 80, 82, 84, 85, 86, 88, 88, 89, 90, 90 }

FIG. 19

4-point DCT-8:

$$\begin{Bmatrix} a, & b, & c, & d, \\ b, & 0, & -b, & -b, \\ c, & -b, & -d, & a, \\ d, & -b, & a, & -c, \end{Bmatrix}$$

where $\{a, b, c, d\} = \{84, 74, 55, 29\}$

*FIG. 20*

8-point DCT-8:

```
{ a,  b,  c,  d,  e,  f,  g,  h,}
{ b,  e,  h, -g, -d, -a, -c, -f,}
{ c,  h, -e, -a, -f,  g,  b,  d,}
{ d, -g, -a, -h,  c,  e, -f, -b,}
{ e, -d, -f,  c,  g, -b, -h,  a,}
{ f, -a,  g,  e, -b,  h,  d, -c,}
{ g, -c,  b, -h, -a,  d,  e,}
{ h, -f,  d, -b,  a, -c,  e, -g,}
``` where {a, b, c, d, e, f, g, h} = { 86, 85, 78, 71, 60, 46, 32, 17}

FIG. 21

16-point DCT-8:

{
 { a, b, c, d, e, f, g, h, i, j, k, l, m, n, o, p, },
 { b, e, h, k, n, o, -l, -i, -f, -c, -a, -d, -g, -j, -m, -p, },
 { c, h, m, -p, -k, -f, -a, -e, -j, -o, n, i, d, b, g, l, },
 { d, k, -p, -i, -b, -f, -m, n, g, a, h, o, -l, -e, -c, -j, },
 { e, n, -k, -b, -h, o, f, -a, -i, p, d, c, -j, -m, b, l, },
 { f, o, -f, -f, o, f, f, -o, -f, f, o, -f, -f, o, f, f, },
 { g, -l, -a, -m, f, h, -k, -b, -n, e, i, -j, -c, -o, d, j, },
 { h, -i, -e, n, b, -o, -a, k, g, -j, -d, m, c, -p, -b, l, },
 { i, -f, -j, g, -h, f, k, -e, h, -l, -d, m, c, -n, -b, o, },
 { j, -c, -o, a, -i, k, -b, -p, b, -k, -i, d, n, -a, l, -m, },
 { k, -a, n, h, -d, o, -i, -b, m, j, -c, p, g, -e, -h, -b, },
 { l, -d, i, o, -c, -f, k, -b, m, p, -e, -i, a, i, o, n, },
 { m, -g, d, -l, -j, f, -c, k, -n, h, -e, -b, o, a, d, -l, },
 { n, -j, b, -e, -m, -p, -o, -h, -a, -c, -i, -a, g, -b, o, -n, },
 { o, -m, g, -c, b, e, h, -h, -b, -k, h, e, -i, -i, m, -o, },
 { p, -n, i, -j, l, -i, d, -a, b, -c, e, -g, h, -k, m, -o, }
} where {a, b, c, d, e, f, g, h, i, j, k, l, m, n, o, p} = { 90, 89, 87, 83, 81, 77, 72, 66, 62, 56, 49, 41, 33, 25, 17, 9}

Number of sub-partitions depending on the block size

| Block Size | Number of Sub-Partitions |
|---|---|
| 4 × 4 | Not divided |
| 4 × 8 and 8 × 4 | 2 |
| All other cases | 4 |

FIG. 24

| | Descriptor |
|---|---|
| coding_unit( x0, y0, cbWidth, cbHeight, treeType ) { | |
|   if( tile_group_type != I \|\| sps_ibc_enabled_flag ) { | |
|     if( treeType != DUAL_TREE_CHROMA ) | |
|       cu_skip_flag[ x0 ][ y0 ] | ae(v) |
|     if( cu_skip_flag[ x0 ][ y0 ] == 0 && tile_group_type != I ) | |
|       pred_mode_flag | ae(v) |
|     if( ( ( tile_group_type == I && cu_skip_flag[ x0 ][ y0 ] ==0 ) \|\| | |
|       ( tile_group_type != I && CuPredMode[ x0 ][ y0 ] != MODE_INTRA ) ) && | |
|       sps_ibc_enabled_flag ) | |
|       pred_mode_ibc_flag | ae(v) |
|   } | |
|   if( CuPredMode[ x0 ][ y0 ] == MODE_INTRA ) { | |
|     if( sps_pcm_enabled_flag && | |
|       cbWidth >= MinIpcmCbSizeY && cbWidth <= MaxIpcmCbSizeY && | |
|       cbHeight >= MinIpcmCbSizeY && cbHeight <= MaxIpcmCbSizeY ) | |
|       pcm_flag[ x0 ][ y0 ] | ae(v) |
|     if( pcm_flag[ x0 ][ y0 ] ) { | |
|       while( !byte_aligned( ) ) | |
|         pcm_alignment_zero_bit | f(1) |
|       pcm_sample( cbWidth, cbHeight, treeType) | |
|     } else { | |
|       if( treeType == SINGLE_TREE \|\| treeType == DUAL_TREE_LUMA ) { | |
|         if( ( y0 % CtbSizeY ) > 0 ) | |
|           intra_luma_ref_idx[ x0 ][ y0 ] | ae(v) |

*FIG. 27A*

| | |
|---|---|
| if( intra_luma_ref_idx[ x0 ][ y0 ] = = 0 && <br> ( cbWidth <= MaxTbSizeY \|\| cbHeight <= MaxTbSizeY ) && <br> ( cbWidth * cbHeight > MinTbSizeY * MinTbSizeY )) | |
|   intra_subpartitions_mode_flag[ x0 ][ y0 ] | ae(v) |
| if( intra_subpartitions_mode_flag[ x0 ][ y0 ] = = 1 && <br> cbWidth <= MaxTbSizeY && cbHeight <= MaxTbSizeY ) | |
|   intra_subpartitions_split_flag[ x0 ][ y0 ] | ae(v) |
| if( intra_luma_ref_idx[ x0 ][ y0 ] = = 0 && <br> intra_subpartitions_mode_flag[ x0 ][ y0 ] = = 0 ) | |
|   intra_luma_mpm_flag[ x0 ][ y0 ] | ae(v) |
| if( intra_luma_mpm_flag[ x0 ][ y0 ] ) | |
|   intra_luma_mpm_idx[ x0 ][ y0 ] | ae(v) |
| else | |
|   intra_luma_mpm_remainder[ x0 ][ y0 ] | ae(v) |
| } | |
| if( treeType = = SINGLE_TREE \|\| treeType = = DUAL_TREE_CHROMA ) | |
|   intra_chroma_pred_mode[ x0 ][ y0 ] | ae(v) |
| } | |
| } else if( treeType != DUAL_TREE_CHROMA ) { /* MODE_INTER or MODE_IBC */ | |
| ...... | |
| } | |

*Continue from FIG. 27A* — 2710, 2700

FIG. 27B

| Sequence parameter set RBSP syntax | Descriptor |
|---|---|
| seq_parameter_set_rbsp() { | |
|   sps_seq_parameter_set_id | ue(v) |
|   ... | |
|   sps_mts_intra_enabled_flag | u(1) |
|   sps_mts_inter_enabled_flag | u(1) |
|   sps_sbt_enable_flag | u(1) |
|   rbsp_trailing_bits() | |
| } | |

2901 (indicating sps_sbt_enable_flag row)

*FIG. 29A*

General slice header syntax

| slice_header( ) { | Descriptor |
|---|---|
|   slice_pic_parameter_set_id | ue(v) |
|   slice_address | u(v) |
|   slice_type | ue(v) |
|   if ( slice_type != I ) { | |
|     log2_diff_ctu_max_bt_size | ue(v) |
|     if( sps_sbtmvp_enabled_flag) { | |
|       sbtmvp_size_override_flag | u(1) |
|       if( sbtmvp_size_override_flag) | |
|         log2_sbtmvp_active_size_minus2 | u(3) |
|     } | |
|     if( sps_temporal_mvp_enabled_flag) | |
|       slice_temporal_mvp_enabled_flag | u(1) |
|     if( slice_type == B ) | |
|       mvd_l1_zero_flag | u(1) |
|     if( slice_temporal_mvp_enabled_flag) { | |
|       if( slice_type == B ) | |
|         collocated_from_l0_flag | u(1) |
|     } | |
|     six_minus_max_num_merge_cand | ue(v) |
|     if( sps_sbt_enable_flag) | |
|       slice_max_sbt_size_64_flag | u(1) |
|   } | |
|   if ( sps_alf_enabled_flag) { | |
|     slice_alf_enabled_flag | u(1) |
|     if( slice_alf_enabled_flag) | |
|       alf_data( ) | |
|   } | |
|   dep_quant_enabled_flag | u(1) |
|   if( !dep_quant_enabled_flag) | |
|     sign_data_hiding_enabled_flag | u(1) |
|   byte_alignment( ) | |
| } | |

*FIG. 29B*    2902

Coding unit syntax

| coding_unit( x0, y0, cbWidth, cbHeight, treeType ) { | Descriptor |
|---|---|
| ... | |
|   if( CuPredMode[ x0 ][ y0 ] != MODE_INTRA && cu_skip_flag[ x0 ][ y0 ] == 0 ) | |
|     cu_cbf | ae(v) |
|   if( cu_cbf ) { | |
|     if( CuPredMode[ x0 ][ y0 ] != MODE_INTRA && sps_sbt_enable_flag ) { | |
|       if( cbWidth <= maxSbtSize && cbHeight <= maxSbtSize ) { | |
|         allowSbtVerHalf = cbWidth >= 8 | |
|         allowSbtVerQuad = cbWidth >= 16 | |
|         allowSbtHorHalf = cbHeight >= 8 | |
|         allowSbtHorQuad = cbHeight >= 16 | |
|         if( allowSbtVerHalf \|\| allowSbtHorHalf \|\|<br>          allowSbtVerQuad \|\| allowSbtHorQuad ) | |
|           cu_sbt_flag[ x0 ][ y0 ] | ae(v) |
|       } | |
|       if( cu_sbt_flag[ x0 ][ y0 ] ) { | |
|         if( ( allowSbtVerHalf \|\| allowSbtHorHalf ) &&<br>          ( allowSbtVerQuad \|\| allowSbtHorQuad ) ) | |
|           cu_sbt_quad_flag[ x0 ][ y0 ] | ae(v) |
|         if( ( cu_sbt_quad_flag[ x0 ][ y0 ] && allowSbtVerQuad && allowSbtHorQuad )<br>          \|\| ( !cu_sbt_quad_flag[ x0 ][ y0 ] && allowSbtVerHalf && allowSbtHorHalf ) ) | |
|           cu_sbt_horizontal_flag[ x0 ][ y0 ] | ae(v) |
|         cu_sbt_pos_flag[ x0 ][ y0 ] | ae(v) |
|       } | |
|     } | |
|   transform_tree( x0, y0, cbWidth, cbHeight, treeType ) | |
|   } | |
| } | |

Transform tree syntax

| transform_tree( x0, y0, tbWidth, tbHeight, treeType ) { | Descriptor |
|---|---|
|   if( tbWidth > MaxTbSizeY \|\| tbHeight > MaxTbSizeY ) { | |
|     trafoWidth = ( tbWidth > MaxTbSizeY ) ? (tbWidth / 2) : tbWidth | |
|     trafoHeight = ( tbHeight > MaxTbSizeY ) ? (tbHeight / 2) : tbHeight | |
|     transform_tree( x0, y0, trafoWidth, trafoHeight ) | |
|     if( tbWidth > MaxTbSizeY ) | |
|       transform_tree( x0 + trafoWidth, y0, trafoWidth, trafoHeight, treeType ) | |
|     if( tbHeight > MaxTbSizeY ) | |
|       transform_tree( x0, y0 + trafoHeight, trafoWidth, trafoHeight, treeType ) | |
|     if( tbWidth > MaxTbSizeY && tbHeight > MaxTbSizeY ) | |
|       transform_tree( x0 + trafoWidth, y0 + trafoHeight, trafoWidth, trafoHeight, treeType ) | |
|   } else if( cu_sbt_flag[ x0 ][ y0 ] ) | |
|     factorTb0 = cu_sbt_quad_flag[ x0 ][ y0 ] ? 1 : 2 | |
|     factorTb0 = cu_sbt_pos_flag[ x0 ][ y0 ] ? ( 4 - factorTb0 ) : factorTb0 | |
|     noResiTb0 = cu_sbt_pos_flag[ x0 ][ y0 ] ? 1 : 0 | |
|     if( !cu_sbt_horizontal_flag[ x0 ][ y0 ] ) { | |
|       trafoWidth = tbWidth * factorTb0 / 4 | |
|       transform_tree( x0, y0, trafoWidth, tbHeight, treeType , noResiTb0 ) | |
|       transform_tree( x0 + trafoWidth, y0, tbWidth - trafoWidth, tbHeight, treeType , !noResiTb0 ) | |
|     } | |
|     else { | |
|       trafoHeight = tbHeight * factorTb0 / 4 | |
|       transform_tree( x0, y0, tbWidth, trafoHeight, treeType , noResiTb0 ) | |
|       transform_tree( x0, y0 + trafoHeight, tbWidth, tbHeight - trafoHeight, treeType , !noResiTb0 ) | |
|     } | |
|   } else { | |
|     transform_unit( x0, y0, tbWidth, tbHeight, treeType, 0 ) | |
|   } | |
| } | |

FIG. 29D  2904

Transform unit syntax

| | Descriptor |
|---|---|
| transform_unit( x0, y0, tbWidth,tbHeight,treeType , noResi ){ | |
|   if( ( treeType == SINGLE_TREE \|\| treeType == DUAL_TREE_LUMA ) && !noResi ) | |
|     tu_cbf_luma[ x0 ][ y0 ] | ae(v) |
|   if( ( treeType == SINGLE_TREE \|\| treeType == DUAL_TREE_CHROMA ) && !noResi ) { | |
|     tu_cbf_cb[ x0 ][ y0 ] | ae(v) |
|     tu_cbf_cr[ x0 ][ y0 ] | ae(v) |
|   } | |
|   if( ( ( ( CuPredMode[ x0 ][ y0 ] == MODE_INTRA ) && sps_mts_intra_enabled_flag ) \|\| <br>     ( ( CuPredMode[ x0 ][ y0 ] == MODE_INTER ) && sps_mts_inter_enabled_flag ) ) <br>     && tu_cbf_luma[ x0 ][ y0 ] && treeType != DUAL_TREE_CHROMA <br>     && ( tbWidth <= 32 ) && ( tbHeight <= 32 ) && !cu_sbt_flag[ x0 ][ y0 ] ) | |
|     cu_mts_flag[ x0 ][ y0 ] | ae(v) |
|   if( tu_cbf_luma[ x0 ][ y0 ] ) | |
|     residual_coding( x0, y0, log2( tbWidth ), log2( tbHeight ), 0 ) | |
|   if( tu_cbf_cb[ x0 ][ y0 ] ) | |
|     residual_coding( x0, y0, log2( tbWidth / 2 ), log2( tbHeight / 2 ), 1 ) | |
|   if( tu_cbf_cr[ x0 ][ y0 ] ) | |
|     residual_coding( x0, y0, log2( tbWidth / 2 ), log2( tbHeight / 2 ), 2 ) | |
| } | |

*FIG. 29E*

Sequence parameter set RBSP semantics sps_sbt_enabled_flag equal to 0 specifies that sub-block transform for inter-predicted CU is disabled. sps_sbt_enabled_flag equal to 1 specifies that sub-block transform for inter-predicted CU is enabled. ⎯ 2908

General slice header semantics slice_sbt_max_size_64_flag equal to 0 specifies that the maximum CU width and height for allowing sub-block transform is 32. slice_sbt_max_size_64_flag equal to 1 specifies that the maximum CU width and height for allowing sub-block transform is 64. ⎯ 2909 maxSbtSize = slice_sbt_max_size_64_flag? 64 : 32

*FIG. 29F*

Coding unit semantics cu_sbt_flag[ x0 ][ y0 ] equal to 1 specifies that for the current coding unit, sub-block transform is used. cu_sbt_flag[ x0 ][ y0 ] equal to 0 specifies that for the current coding unit, the sub-block transform is not used.

When cu_sbt_flag[ x0 ][ y0 ] is not present, its value is inferred to be equal to 0.

NOTE – : When sub-block transform is used, a coding unit is tiled into two transform units, one transform unit has residual, the other does not have residual.

cu_sbt_quad_flag[ x0 ][ y0 ] equal to 1 specifies that for the current coding unit, the sub-block transform include a transform unit of 1/4 size of the current coding unit. cu_sbt_quad_flag[ x0 ][ y0 ] equal to 0 specifies that for the current coding unit the sub-block transform include a transform unit of 1/2 size of the current coding unit.

When cu_sbt_quad_flag[ x0 ][ y0 ] is not present, its value is inferred to be equal to 0.

cu_sbt_horizontal_flag[ x0 ][ y0 ] equal to 1 specifies that the current coding unit is tiled into 2 transform units by a horizontal split. cu_sbt_horizontal_flag[ x0 ][ y0 ] equal to 0 specifies that the current coding unit is tiled into 2 transform units by a vertical split.

When cu_sbt_horizontal_flag[ x0 ][ y0 ] is not present, its value is derived as follows:

- If cu_sbt_quad_flag[ x0 ][ y0 ] is equal to 1, cu_sbt_horizontal_flag[ x0 ][ y0 ] is set to be equal to allowSbtHoriQuad.
- Otherwise (cu_sbt_quad_flag[ x0 ][ y0 ] is equal to 0), cu_sbt_horizontal_flag[ x0 ][ y0 ] is set to be equal to allowSbtHoriHalf.

cu_sbt_pos_flag[ x0 ][ y0 ] equal to 1 specifies that the tu_cbf_luma, tu_cbf_cb and tu_cbf_cr of the first transform unit in the current coding unit are not present in the bitstream. cu_sbt_pos_flag[ x0 ][ y0 ] equal to 0 specifies that the tu_cbf_luma, tu_cbf_cb and tu_cbf_cr of the second transform unit in the current coding unit are not present in the bitstream.

Transformation process for scaled transform coefficients

General

Inputs to this process are:

- a luma location ( xTbY, yTbY ) specifying the top-left sample of the current luma transform block relative to the top-left luma sample of the current picture,
- a variable nTbW specifying the width of the current transform block,
- a variable nTbH specifying the height of the current transform block,
- a variable cIdx specifying the colour component of the current block,
- an (nTbW)x(nTbH) array d[ x ][ y ] of scaled transform coefficients with x = 0..nTbW − 1, y = 0..nTbH − 1.

Output of this process is the (nTbW)x(nTbH) array r[ x ][ y ] of residual samples with x = 0..nTbW − 1, y = 0..nTbH − 1.

2912 → If cu_sbt_flag[ xTbY ][ yTbY ] is equal to 1, the variable trTypeHor specifying the horizontal transform kernel and the variable trTypeVer specifying the vertical transform kernel are derived in Table 8-X depending on cu_sbt_horizontal_flag[ xTbY ][ yTbY ] and cu_sbt_pos_flag[ xTbY ][ yTbY ].

Otherwise (cu_sbt_flag[ xTbY ][ yTbY ] is equal to 0), the variable trTypeHor specifying the horizontal transform kernel and the variable trTypeVer specifying the vertical transform kernel are derived in Table 8-9 depending on mts_idx[ xTbY ][ yTbY ] and CuPredMode[ xTbY ][ yTbY ].

The (nTbW)x(nTbH) array r of residual samples is derived as follows:

1. Each (vertical) column of scaled transform coefficients d[ x ][ y ] with x = 0..nTbW − 1, y = 0..nTbH − 1 is transformed to e[ x ][ y ] with x = 0..nTbW − 1, y = 0..nTbH − 1 by invoking the one-dimensional transformation process for each column x = 0..nTbW − 1 with the height of the transform block nTbH, the list d[ x ][ y ] with y = 0..nTbH − 1 and the transform type variable trType set equal to trTypeVer as inputs, and the output is the list e[ x ][ y ] with y = 0..nTbH − 1.

2. The intermediate sample values g[ x ][ y ] with x = 0..nTbW − 1, y = 0..nTbH − 1 are derived as follows:

g[ x ][ y ] = Clip3( CoeffMin, CoeffMax, ( e[ x ][ y ] + 256 ) >> 9 )

FIG. 29H

Continue from FIG. 29H

3. Each (horizontal) row of the resulting array g[ x ][ y ] with x = 0..nTbW − 1, y = 0..nTbH − 1 is transformed to r[ x ][ y ] with x = 0..nTbW − 1, y = 0..nTbH − 1 by invoking the one-dimensional transformation process for each row y = 0..nTbH − 1 with the width of the transform block nTbW, the list g[ x ][ y ] with x = 0..nTbW − 1 and the transform type variable trType set equal to trTypeHor as inputs, and the output is the list r[ x ][ y ] with x = 0..nTbW − 1.

Table 8-X − Specification of trTypeHor and trTypeVer depending on mts_idx[ x ][ y ] and CuPredMode[ x ][ y ]

|  | cu_sbt_horizontal_flag [ xTbY ][ yTbY ] == 0 | | cu_sbt_horizontal_flag [ xTbY ][ yTbY ] == 1 | |
|---|---|---|---|---|
|  | cu_sbt_pos_flag [ xTbY ][ yTbY ] == 0 | cu_sbt_pos_flag [ xTbY ][ yTbY ] == 1 | cu_sbt_pos_flag [ xTbY ][ yTbY ] == 0 | cu_sbt_pos_flag [ xTbY ][ yTbY ] == 1 |
| trTypeHor | 2 | 1 | nTbW > 32 ? 0 : 1 | nTbW > 32 ? 0 : 1 |
| trTypeVer | nTbH > 32 ? 0 : 1 | nTbH > 32 ? 0 : 1 | 2 | 1 |

≈ 2913

Table 8-9 − Specification of trTypeHor and trTypeVer depending on mts_idx[ x ][ y ] and CuPredMode[ x ][ y ]

| mts_idx[ xTbY ][ yTbY ] | CuPredMode[ xTbY ][ yTbY ] ==MODE_INTRA | | CuPredMode[ xTbY ][ xTbY ] == MODE_INTER | |
|---|---|---|---|---|
|  | trTypeHor | trTypeVer | trTypeHor | trTypeVer |
| −1 (inferred) | 0 | 0 | 0 | 0 |
| 0 (00) | 1 | 1 | 2 | 2 |
| 1 (01) | 2 | 1 | 1 | 2 |
| 2 (10) | 1 | 2 | 2 | 1 |
| 3 (11) | 2 | 2 | 1 | 1 |

FIG. 29I

METHOD AND APPARATUS FOR VIDEO CODING

INCORPORATION BY REFERENCE

This present application is a continuation of U.S. patent application Ser. No. 16/827,248, "METHOD AND APPARATUS FOR VIDEO CODING" filed on Mar. 23, 2020, which claims the benefit of priority to U.S. Provisional Application No. 62/824,019, "COUPLED CTU SIZE AND MAXIMUM TU SIZE" filed on Mar. 26, 2019. The entire disclosures of the prior applications are hereby incorporated by reference in their entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Video coding and decoding can be performed using inter-picture prediction with motion compensation. Uncompressed digital video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of video coding and decoding can be the reduction of redundancy in the input video signal, through compression. Compression can help reduce the aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

A video encoder and decoder can utilize techniques from several broad categories, including, for example, motion compensation, transform, quantization, and entropy coding.

Video codec technologies can include techniques known as intra coding. In intra coding, sample values are represented without reference to samples or other data from previously reconstructed reference pictures. In some video codecs, the picture is spatially subdivided into blocks of samples. When all blocks of samples are coded in intra mode, that picture can be an intra picture. Intra pictures and their derivations such as independent decoder refresh pictures, can be used to reset the decoder state and can, therefore, be used as the first picture in a coded video bitstream and a video session, or as a still image. The samples of an intra block can be exposed to a transform, and the transform coefficients can be quantized before entropy coding. Intra prediction can be a technique that minimizes sample values in the pre-transform domain. In some cases, the smaller the DC value after a transform is, and the smaller the AC coefficients are, the fewer the bits that are required at a given quantization step size to represent the block after entropy coding.

Traditional intra coding such as known from, for example MPEG-2 generation coding technologies, does not use intra prediction. However, some newer video compression technologies include techniques that attempt, from, for example, surrounding sample data and/or metadata obtained during the encoding/decoding of spatially neighboring, and preceding in decoding order, blocks of data. Such techniques are henceforth called "intra prediction" techniques. Note that in at least some cases, intra prediction is only using reference data from the current picture under reconstruction and not from reference pictures.

There can be many different forms of intra prediction. When more than one of such techniques can be used in a given video coding technology, the technique in use can be coded in an intra prediction mode. In certain cases, modes can have submodes and/or parameters, and those can be coded individually or included in the mode codeword. Which codeword to use for a given mode/submode/parameter combination can have an impact in the coding efficiency gain through intra prediction, and so can the entropy coding technology used to translate the codewords into a bitstream.

A certain mode of intra prediction was introduced with H.264, refined in H.265, and further refined in newer coding technologies such as joint exploration model (JEM), versatile video coding (VVC), and benchmark set (BMS). A predictor block can be formed using neighboring sample values belonging to already available samples. Sample values of neighboring samples are copied into the predictor block according to a direction. A reference to the direction in use can be coded in the bitstream or may itself be predicted.

SUMMARY

Aspects of the disclosure provide methods and apparatuses for video encoding/decoding. In some examples, an apparatus for video encoding includes processing circuitry. The processing circuitry determines a maximum transform size for partitioning a block in a coding tree unit (CTU) based on a size of the CTU. Then, the processing circuitry partitions the block into one or more transform blocks based on the maximum transform size, and encodes residues associated with a prediction of the block into bits in a bitstream, according to the one of more transform blocks.

In some embodiments, the processing circuitry scales the size of the CTU by a scaling factor to determine the maximum transform size. In an example, the scaling factor is predetermined. In another example, the processing circuitry includes information indicative of the scaling factor in the bitstream.

In an embodiment, the processing circuitry divides the CTU size by an allowable number for transform units in the CTU to determine the maximum transform size.

In some embodiments, the processing circuitry determines the maximum transform size, based on a size of block. In an example, the processing circuitry, determines, in response to the prediction of the block being an intra prediction, the maximum transform size as a minimum size of the block and an allowable maximum transform size for intra coded blocks. In another example, the processing circuitry determines, in response to the prediction of the block being an inter prediction, the maximum transform size as a minimum size of the block and an allowable maximum transform size for inter coded blocks. In another example, the processing circuitry determines the maximum transform size based on a smaller size of a weight and a height of the block.

Aspects of the disclosure also provide a non-transitory computer-readable medium storing instructions which when executed by a computer for video encoding cause the computer to perform the method for video encoding.

BRIEF DESCRIPTION OF THE DRAWINGS

Further features, the nature, and various advantages of the disclosed subject matter will be more apparent from the following detailed description and the accompanying drawings in which:

Figure 10:
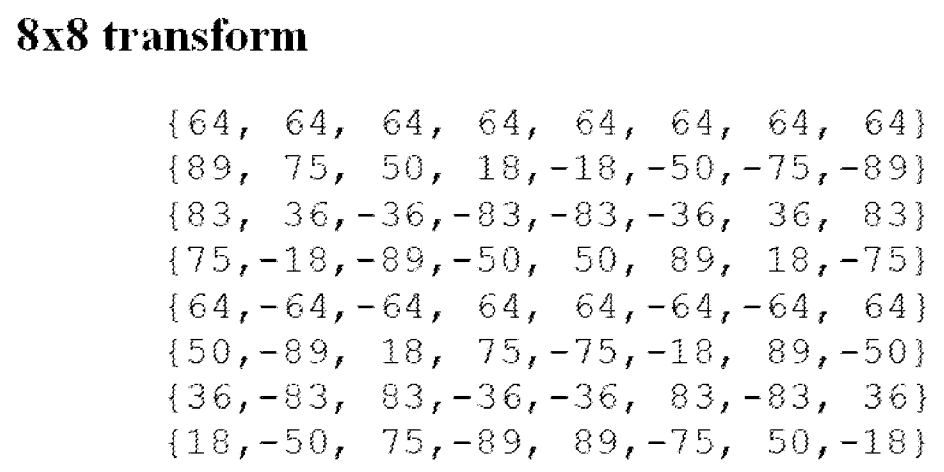
Figure 11:
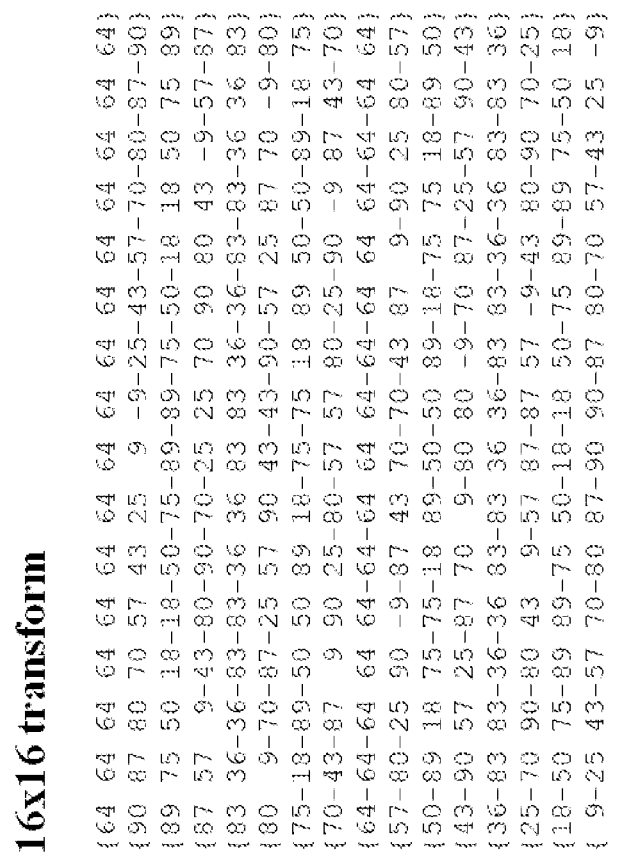
Figure 12:
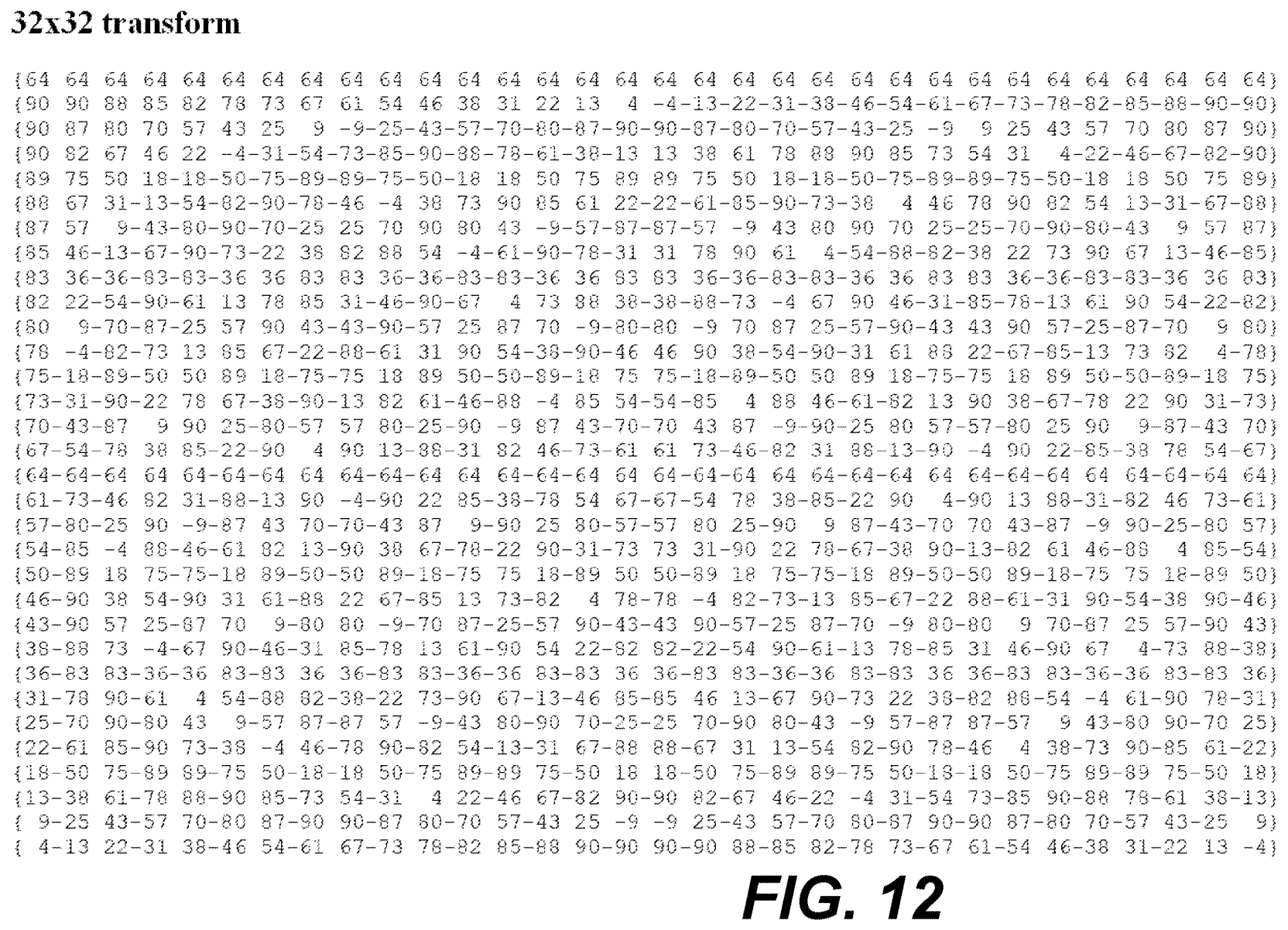

FIGS. 9-12 show transform core matrices in some examples.

Figure 13A:
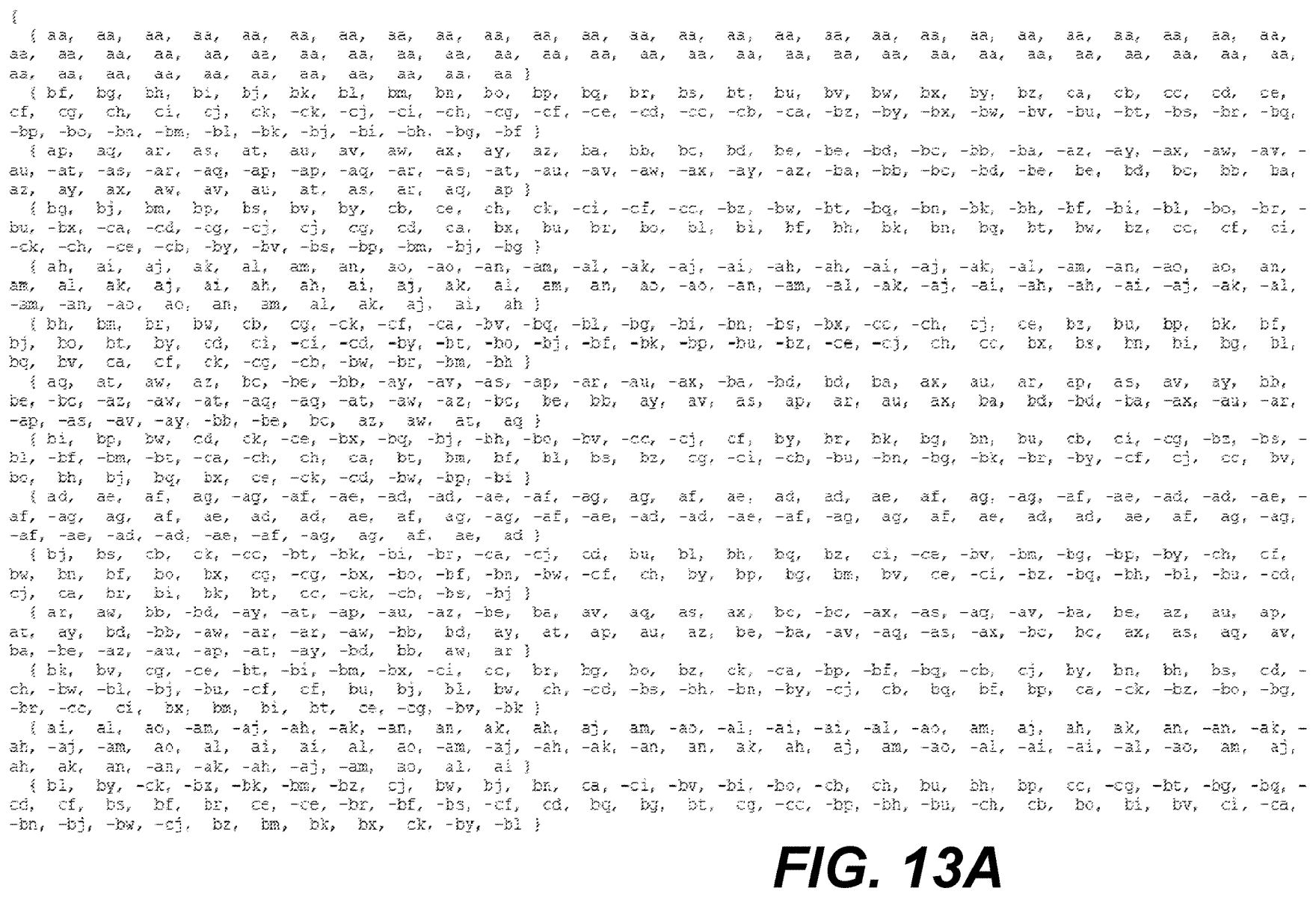
Figure 13B:
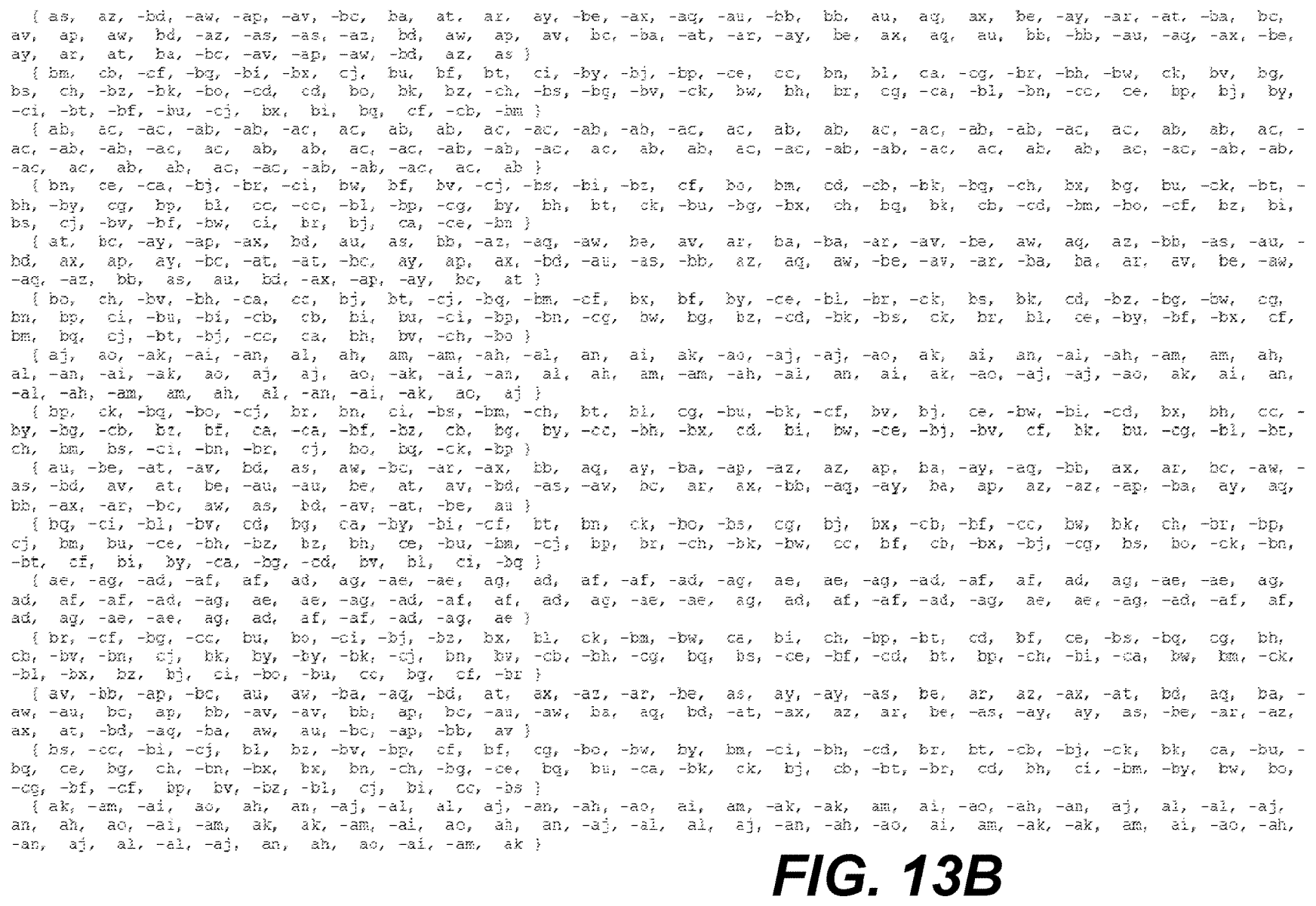
Figure 13C:
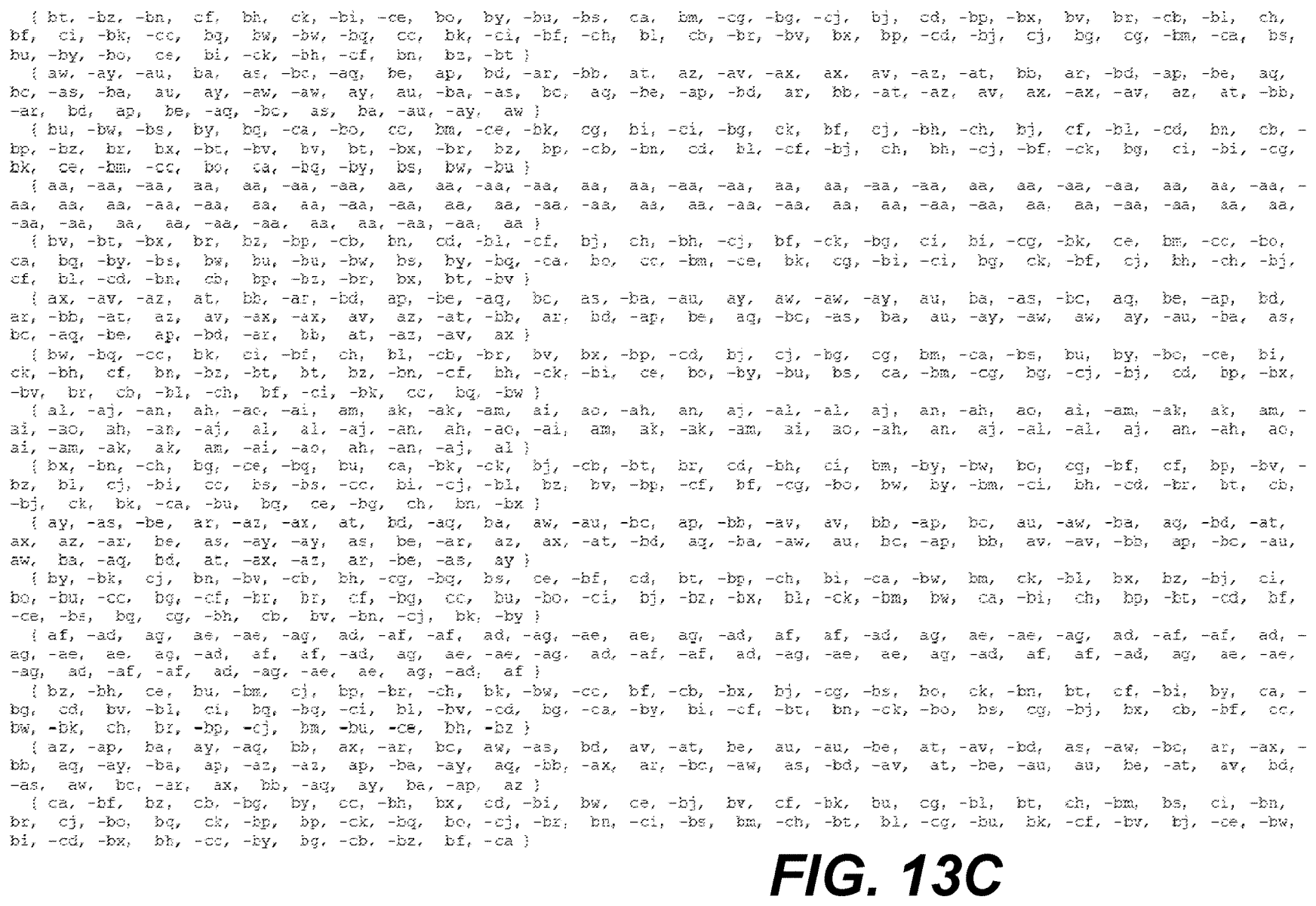
Figure 13D:
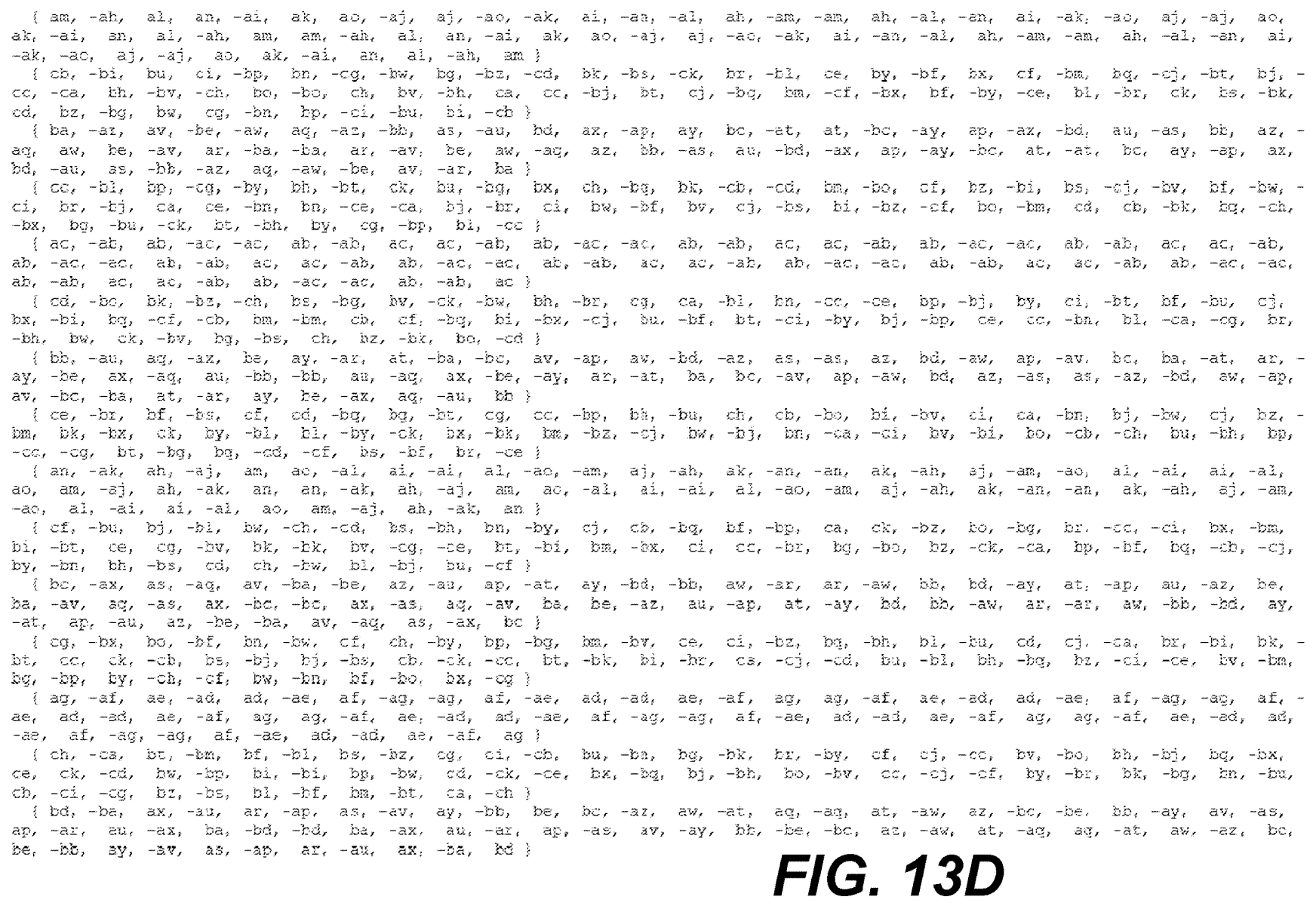
Figure 13E:
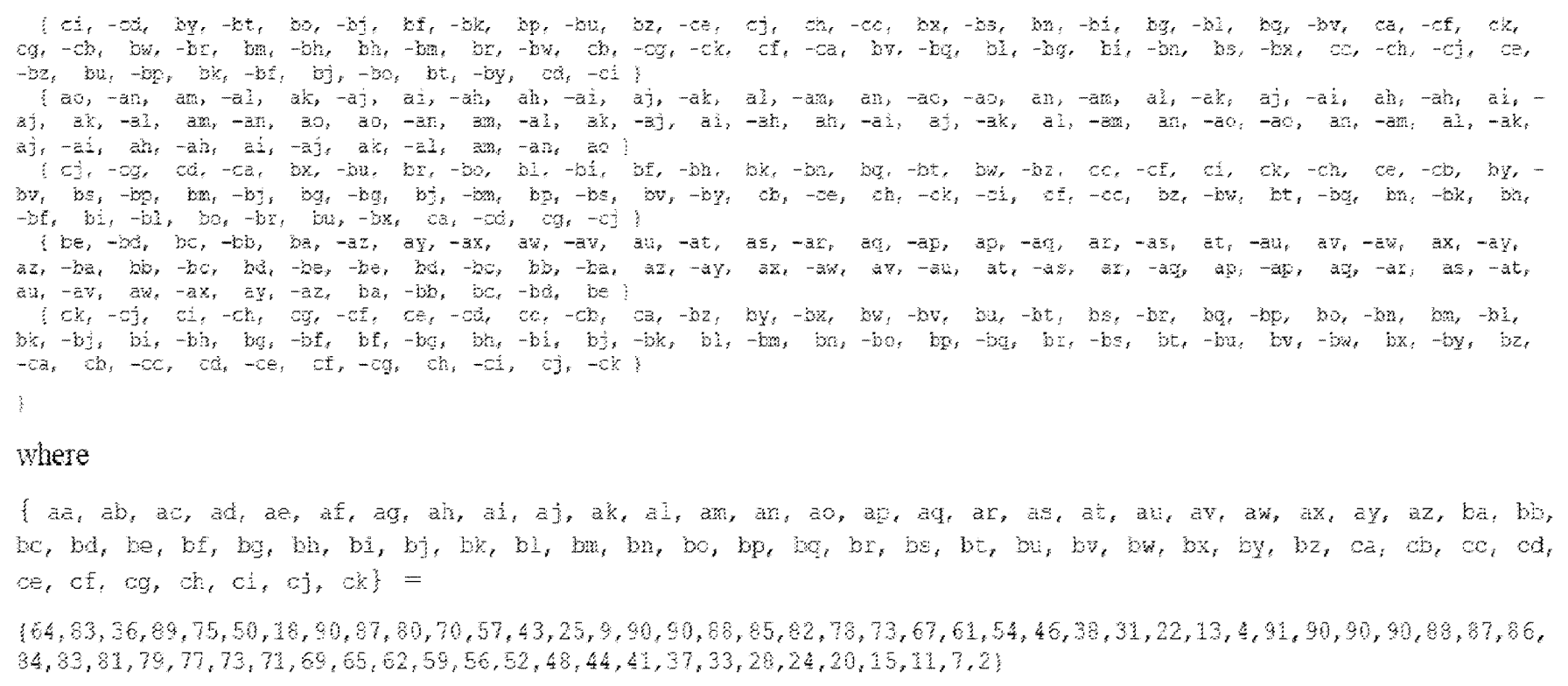

FIGS. 13A-13E show a 64×64 transform core matrix.

FIG. 14 shows transform basis functions of the selected DST/DCT transforms.

FIG. 15 shows a table illustrating a mapping relationship between indices and transform types.

FIGS. 16-19 show transform core matrices of DST-7 transform.

Figure 23:
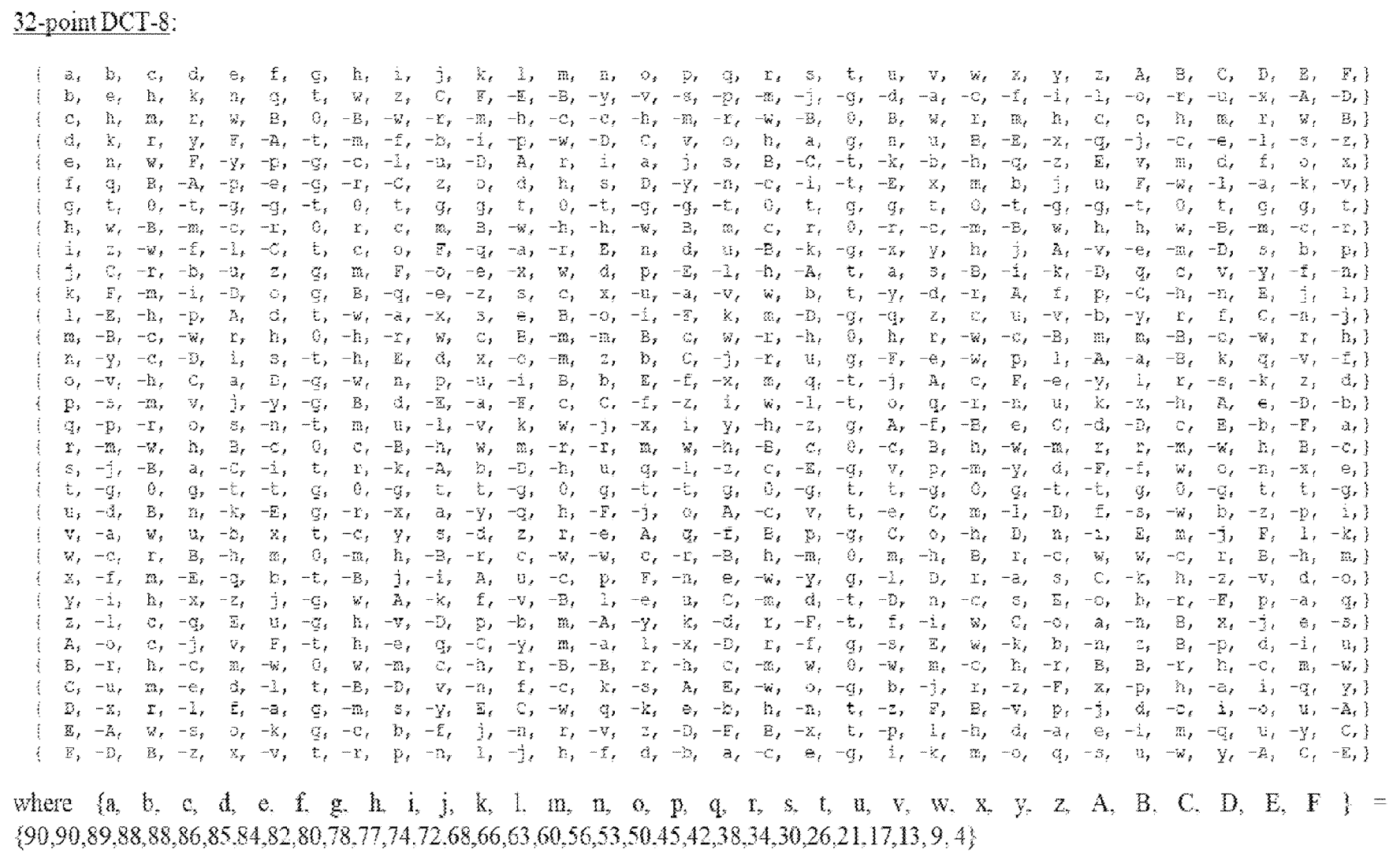

FIGS. 20-23 show transform core matrices of DCT-8 transform.

FIG. 24 shows the number of sub-partitions depending on the block size.

FIGS. 27A-27B show an example syntax table that includes related syntax elements signaled for an ISP coding mode.

FIGS. 29A-29I show specification text of a video coding standard when SBT is used.

DETAILED DESCRIPTION OF EMBODIMENTS

Figure 1:
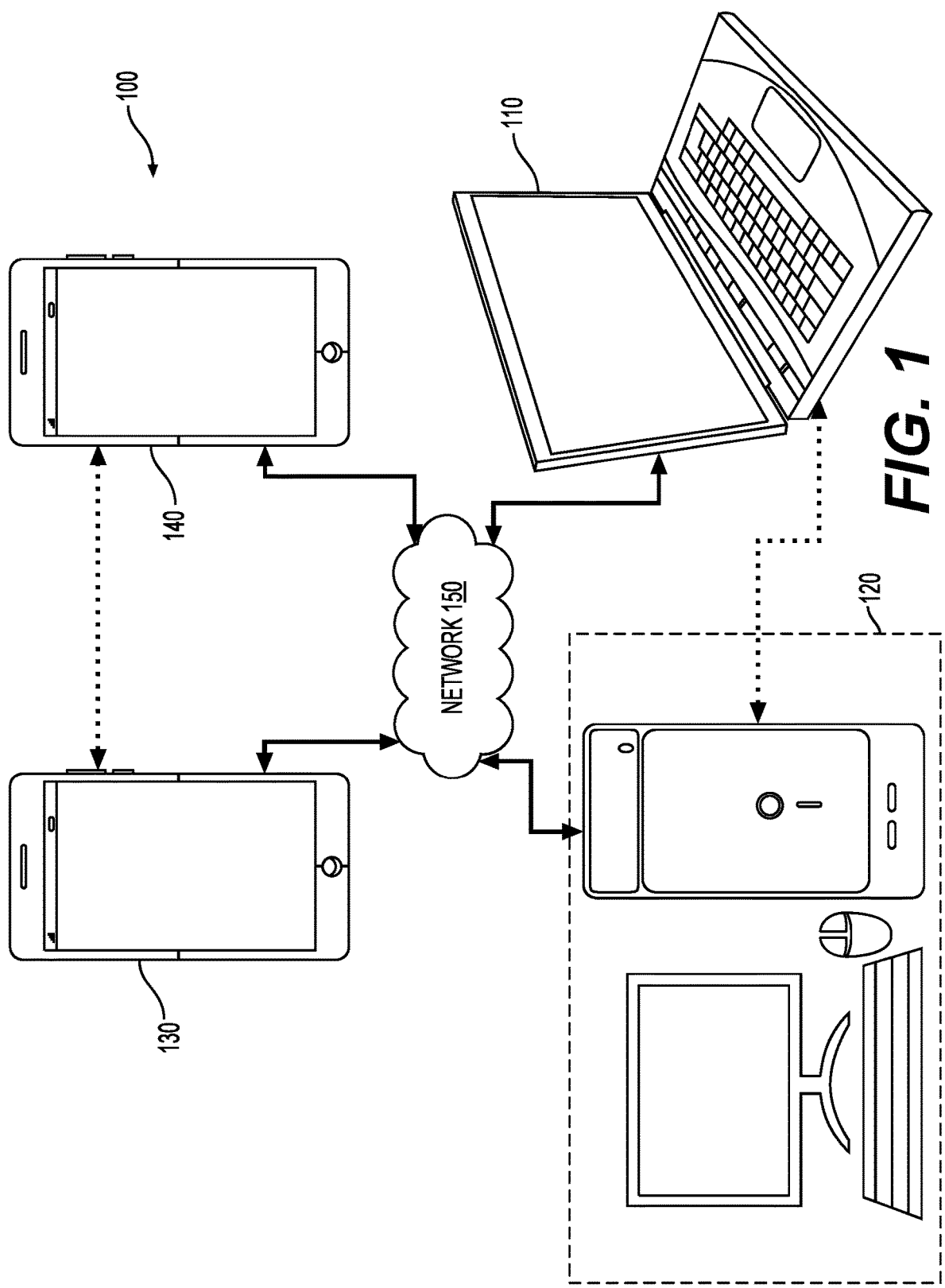
FIG. 1 is a schematic illustration of a simplified block diagram of a communication system (100) in accordance with an embodiment.

FIG. 1 illustrates a simplified block diagram of a communication system (100) according to an embodiment of the present disclosure. The communication system (100) includes a plurality of terminal devices that can communicate with each other, via, for example, a network (150). For example, the communication system (100) includes a first pair of terminal devices (110) and (120) interconnected via the network (150). In the FIG. 1 example, the first pair of terminal devices (110) and (120) performs unidirectional transmission of data. For example, the terminal device (110) may code video data (e.g., a stream of video pictures that are captured by the terminal device (110)) for transmission to the other terminal device (120) via the network (150). The encoded video data can be transmitted in the form of one or more coded video bitstreams. The terminal device (120) may receive the coded video data from the network (150), decode the coded video data to recover the video pictures and display video pictures according to the recovered video data. Unidirectional data transmission may be common in media serving applications and the like.

In another example, the communication system (100) includes a second pair of terminal devices (130) and (140) that performs bidirectional transmission of coded video data that may occur, for example, during videoconferencing. For bidirectional transmission of data, in an example, each terminal device of the terminal devices (130) and (140) may code video data (e.g., a stream of video pictures that are captured by the terminal device) for transmission to the other terminal device of the terminal devices (130) and (140) via the network (150). Each terminal device of the terminal devices (130) and (140) also may receive the coded video data transmitted by the other terminal device of the terminal devices (130) and (140), and may decode the coded video data to recover the video pictures and may display video pictures at an accessible display device according to the recovered video data.

In the FIG. 1 example, the terminal devices (110), (120), (130) and (140) may be illustrated as servers, personal computers and smart phones but the principles of the present disclosure may be not so limited. Embodiments of the present disclosure find application with laptop computers, tablet computers, media players and/or dedicated video conferencing equipment. The network (150) represents any number of networks that convey coded video data among the terminal devices (110), (120), (130) and (140), including for example wireline (wired) and/or wireless communication networks. The communication network (150) may exchange data in circuit-switched and/or packet-switched channels. Representative networks include telecommunications networks, local area networks, wide area networks and/or the Internet. For the purposes of the present discussion, the architecture and topology of the network (150) may be immaterial to the operation of the present disclosure unless explained herein below.

Figure 2:
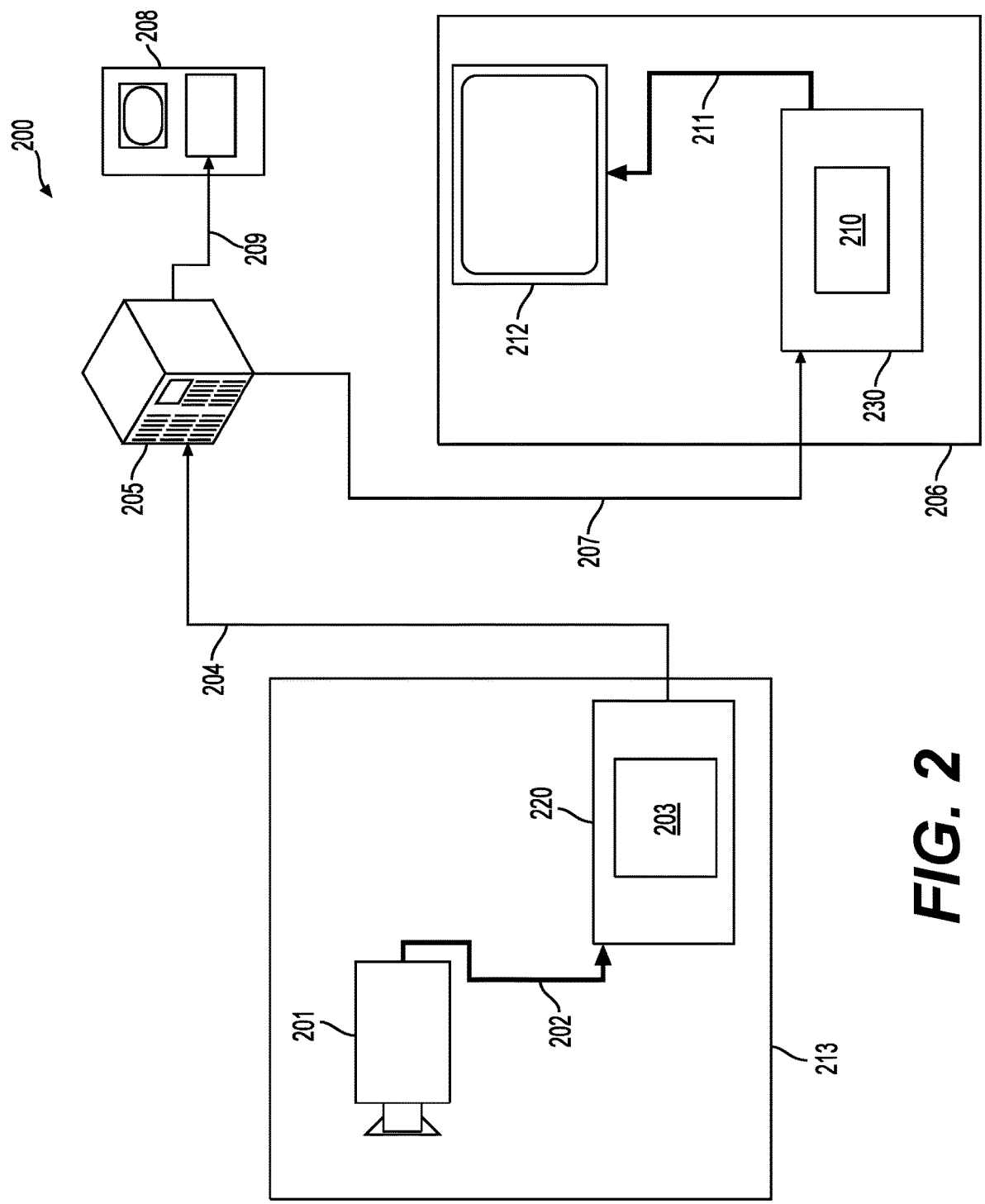
FIG. 2 is a schematic illustration of a simplified block diagram of a communication system (200) in accordance with an embodiment.

FIG. 2 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (213), that can include a video source (201), for example a digital camera, creating for example a stream of video pictures (202) that are uncompressed. In an example, the stream of video pictures (202) includes samples that are taken by the digital camera. The stream of video pictures (202), depicted as a bold line to emphasize a high data volume when compared to encoded video data (204) (or coded video bitstreams), can be processed by an electronic device (220) that includes a video encoder (203) coupled to the video source (201). The video encoder (203) can include hardware, software, or a combination thereof to enable or implement aspects of the disclosed subject matter as described in more detail below. The encoded video data (204) (or encoded video bitstream (204)), depicted as a thin line to emphasize the lower data volume when compared to the stream of video pictures (202), can be stored on a streaming server (205) for future use. One or more streaming client subsystems, such as client subsystems (206) and (208) in FIG. 2 can access the streaming server (205) to retrieve copies (207) and (209) of the encoded video data (204). A client subsystem (206) can include a video decoder (210), for example, in an electronic device (230). The video decoder (210) decodes the incoming copy (207) of the encoded video data and creates an outgoing stream of video pictures (211) that can be rendered on a display (212) (e.g., display screen) or other rendering device (not depicted). In some streaming systems, the encoded video data (204), (207), and (209) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (220) and (230) can include other components (not shown). For example, the electronic device (220) can include a video decoder (not shown) and the electronic device (230) can include a video encoder (not shown) as well.

Figure 3:
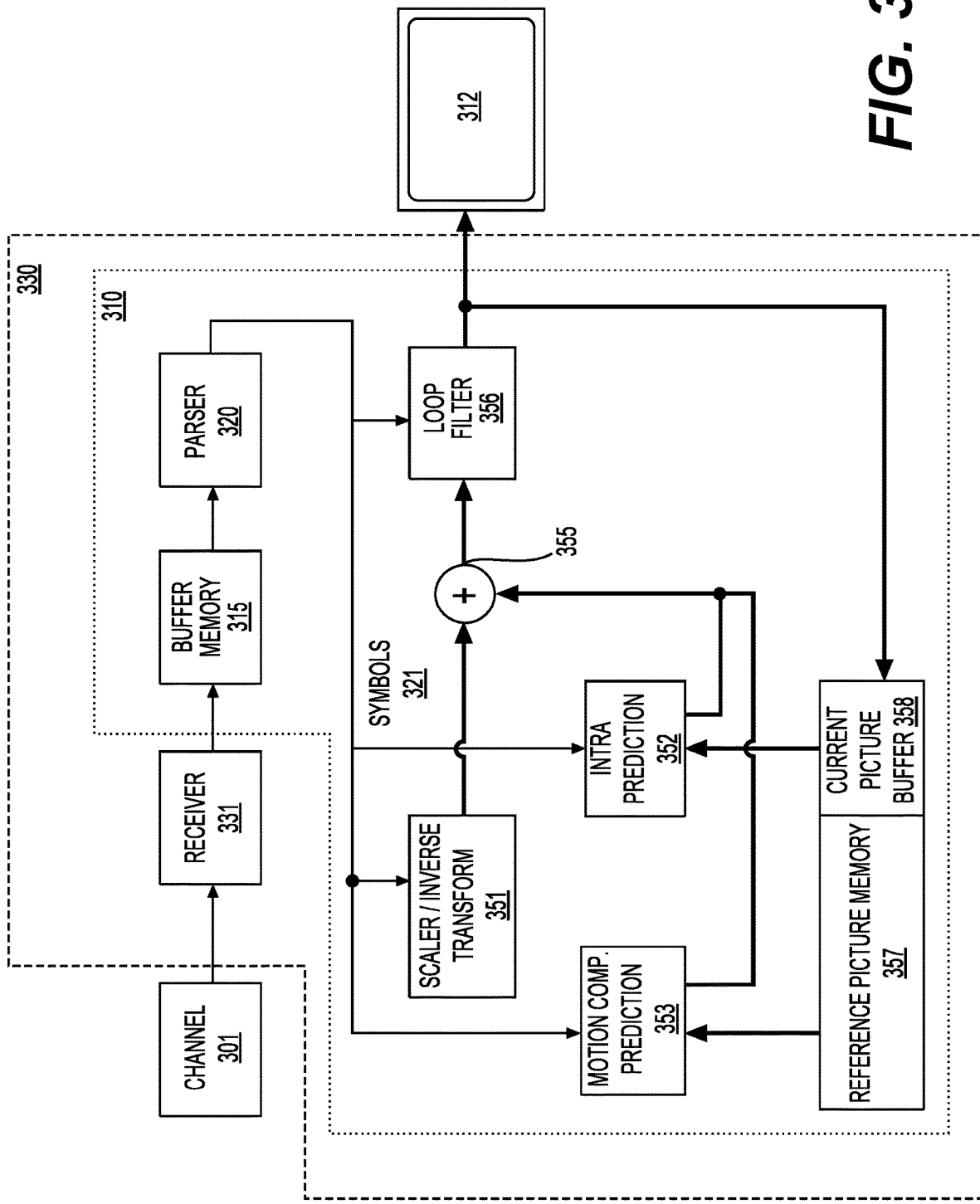
FIG. 3 is a schematic illustration of a simplified block diagram of a decoder in accordance with an embodiment.

FIG. 3 shows a block diagram of a video decoder (310) according to an embodiment of the present disclosure. The video decoder (310) can be included in an electronic device (330). The electronic device (330) can include a receiver (331) (e.g., receiving circuitry). The video decoder (310) can be used in the place of the video decoder (210) in the FIG. 2 example.

The receiver (331) may receive one or more coded video sequences to be decoded by the video decoder (310); in the same or another embodiment, one coded video sequence at a time, where the decoding of each coded video sequence is independent from other coded video sequences. The coded video sequence may be received from a channel (301), which may be a hardware/software link to a storage device which stores the encoded video data. The receiver (331) may receive the encoded video data with other data, for example, coded audio data and/or ancillary data streams, that may be forwarded to their respective using entities (not depicted). The receiver (331) may separate the coded video sequence from the other data. To combat network jitter, a buffer memory (315) may be coupled in between the receiver (331) and an entropy decoder/parser (320) ("parser (320)" henceforth). In certain applications, the buffer memory (315) is part of the video decoder (310). In others, it can be outside of the video decoder (310) (not depicted). In still others, there can be a buffer memory (not depicted) outside of the video decoder (310), for example to combat network jitter, and in addition another buffer memory (315) inside the video decoder (310), for example to handle playout timing. When the receiver (331) is receiving data from a store/forward device of sufficient bandwidth and controllability, or from an isosynchronous network, the buffer memory (315) may not be needed, or can be small. For use on best effort packet networks such as the Internet, the buffer memory (315) may be required, can be comparatively large and can be advantageously of adaptive size, and may at least partially be implemented in an operating system or similar elements (not depicted) outside of the video decoder (310).

The video decoder (310) may include the parser (320) to reconstruct symbols (321) from the coded video sequence. Categories of those symbols include information used to manage operation of the video decoder (310), and potentially information to control a rendering device such as a render device (312) (e.g., a display screen) that is not an integral part of the electronic device (330) but can be coupled to the electronic device (330), as was shown in FIG. 3. The control information for the rendering device(s) may be in the form of Supplemental Enhancement Information (SEI messages) or Video Usability Information (VUI) parameter set fragments (not depicted). The parser (320) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (320) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (320) may also extract from the coded video sequence information such as transform coefficients, quantizer parameter values, motion vectors, and so forth.

The parser (320) may perform an entropy decoding/parsing operation on the video sequence received from the buffer memory (315), so as to create symbols (321).

Reconstruction of the symbols (321) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (320). The flow of such subgroup control information between the parser (320) and the multiple units below is not depicted for clarity.

Beyond the functional blocks already mentioned, the video decoder (310) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (351). The scaler/inverse transform unit (351) receives a quantized transform coefficient as well as control information, including which transform to use, block size, quantization factor, quantization scaling matrices, etc. as symbol(s) (321) from the parser (320). The scaler/inverse transform unit (351) can output blocks comprising sample values, that can be input into aggregator (355).

In some cases, the output samples of the scaler/inverse transform (351) can pertain to an intra coded block; that is: a block that is not using predictive information from previously reconstructed pictures, but can use predictive information from previously reconstructed parts of the current picture. Such predictive information can be provided by an intra picture prediction unit (352). In some cases, the intra picture prediction unit (352) generates a block of the same size and shape of the block under reconstruction, using surrounding already reconstructed information fetched from the current picture buffer (358). The current picture buffer (358) buffers, for example, partly reconstructed current picture and/or fully reconstructed current picture. The aggregator (355), in some cases, adds, on a per sample basis, the prediction information the intra prediction unit (352) has generated to the output sample information as provided by the scaler/inverse transform unit (351).

In other cases, the output samples of the scaler/inverse transform unit (351) can pertain to an inter coded, and potentially motion compensated block. In such a case, a motion compensation prediction unit (353) can access reference picture memory (357) to fetch samples used for prediction. After motion compensating the fetched samples in accordance with the symbols (321) pertaining to the block, these samples can be added by the aggregator (355) to the output of the scaler/inverse transform unit (351) (in this case called the residual samples or residual signal) so as to generate output sample information. The addresses within the reference picture memory (357) from where the motion compensation prediction unit (353) fetches prediction samples can be controlled by motion vectors, available to the motion compensation prediction unit (353) in the form of symbols (321) that can have, for example X, Y, and reference picture components. Motion compensation also can include interpolation of sample values as fetched from the reference picture memory (357) when sub-sample exact motion vectors are in use, motion vector prediction mechanisms, and so forth.

The output samples of the aggregator (355) can be subject to various loop filtering techniques in the loop filter unit (356). Video compression technologies can include in-loop filter technologies that are controlled by parameters included in the coded video sequence (also referred to as coded video bitstream) and made available to the loop filter unit (356) as symbols (321) from the parser (320), but can also be responsive to meta-information obtained during the decoding of previous (in decoding order) parts of the coded picture or coded video sequence, as well as responsive to previously reconstructed and loop-filtered sample values.

The output of the loop filter unit (356) can be a sample stream that can be output to the render device (312) as well as stored in the reference picture memory (357) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (320)), the current picture buffer (358) can become a part of the reference picture memory (357), and a fresh current picture buffer can be reallocated before commencing the reconstruction of the following coded picture.

The video decoder (310) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (331) may receive additional (redundant) data with the encoded video. The additional data may be included as part of the coded video sequence(s). The additional data may be used by the video decoder (310) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 4:
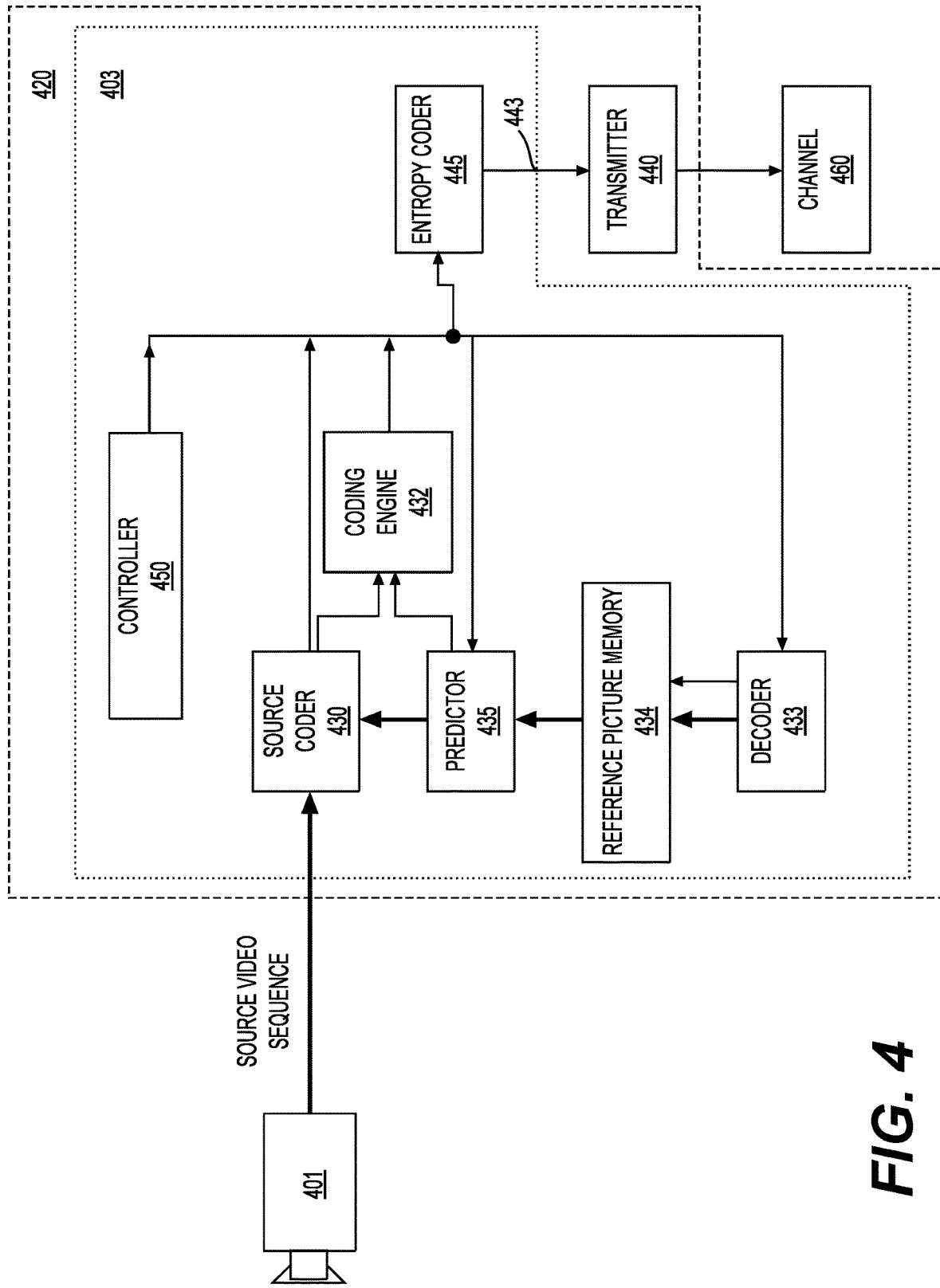
FIG. 4 is a schematic illustration of a simplified block diagram of an encoder in accordance with an embodiment.

FIG. 4 shows a block diagram of a video encoder (403) according to an embodiment of the present disclosure. The video encoder (403) is included in an electronic device (420). The electronic device (420) includes a transmitter (440) (e.g., transmitting circuitry). The video encoder (403) can be used in the place of the video encoder (203) in the FIG. 2 example.

The video encoder (403) may receive video samples from a video source (401) (that is not part of the electronic device (420) in the FIG. 4 example) that may capture video image(s) to be coded by the video encoder (403). In another example, the video source (401) is a part of the electronic device (420).

The video source (401) may provide the source video sequence to be coded by the video encoder (403) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (401) may be a storage device storing previously prepared video. In a videoconferencing system, the video source (401) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (403) may code and compress the pictures of the source video sequence into a coded video sequence (443) in real time or under any other time constraints as required by the application. Enforcing appropriate coding speed is one function of a controller (450). In some embodiments, the controller (450) controls other functional units as described below and is functionally coupled to the other functional units. The coupling is not depicted for clarity. Parameters set by the controller (450) can include rate control related parameters (picture skip, quantizer, lambda value of rate-distortion optimization techniques, . . . ), picture size, group of pictures (GOP) layout, maximum motion vector search range, and so forth. The controller (450) can be configured to have other suitable functions that pertain to the video encoder (403) optimized for a certain system design.

In some embodiments, the video encoder (403) is configured to operate in a coding loop. As an oversimplified description, in an example, the coding loop can include a source coder (430) (e.g., responsible for creating symbols, such as a symbol stream, based on an input picture to be coded, and a reference picture(s)), and a (local) decoder (433) embedded in the video encoder (403). The decoder (433) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (434). As the decoding of a symbol stream leads to bit-exact results independent of decoder location (local or remote), the content in the reference picture memory (434) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (433) can be the same as of a "remote" decoder, such as the video decoder (310), which has already been described in detail above in conjunction with FIG. 3. Briefly referring also to FIG. 3, however, as symbols are available and encoding/decoding of symbols to a coded video sequence by an entropy coder (445) and the parser (320) can be lossless, the entropy decoding parts of the video decoder (310), including the buffer memory (315), and parser (320) may not be fully implemented in the local decoder (433).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (430) may perform motion compensated predictive coding, which codes an input picture predictively with reference to one or more previously-coded picture from the video sequence that were designated as "reference pictures". In this manner, the coding engine (432) codes differences between pixel blocks of an input picture and pixel blocks of reference picture(s) that may be selected as prediction reference(s) to the input picture.

The local video decoder (433) may decode coded video data of pictures that may be designated as reference pictures, based on symbols created by the source coder (430). Operations of the coding engine (432) may advantageously be lossy processes. When the coded video data may be decoded at a video decoder (not shown in FIG. 4), the reconstructed video sequence typically may be a replica of the source video sequence with some errors. The local video decoder (433) replicates decoding processes that may be performed by the video decoder on reference pictures and may cause reconstructed reference pictures to be stored in the reference picture cache (434). In this manner, the video encoder (403) may store copies of reconstructed reference pictures locally that have common content as the reconstructed reference pictures that will be obtained by a far-end video decoder (absent transmission errors).

The predictor (435) may perform prediction searches for the coding engine (432). That is, for a new picture to be coded, the predictor (435) may search the reference picture memory (434) for sample data (as candidate reference pixel blocks) or certain metadata such as reference picture motion vectors, block shapes, and so on, that may serve as an appropriate prediction reference for the new pictures. The predictor (435) may operate on a sample block-by-pixel block basis to find appropriate prediction references. In some cases, as determined by search results obtained by the predictor (435), an input picture may have prediction references drawn from multiple reference pictures stored in the reference picture memory (434).

The controller (450) may manage coding operations of the source coder (430), including, for example, setting of parameters and subgroup parameters used for encoding the video data.

Output of all aforementioned functional units may be subjected to entropy coding in the entropy coder (445). The entropy coder (445) translates the symbols as generated by the various functional units into a coded video sequence, by lossless compressing the symbols according to technologies such as Huffman coding, variable length coding, arithmetic coding, and so forth.

The transmitter (440) may buffer the coded video sequence(s) as created by the entropy coder (445) to prepare for transmission via a communication channel (460), which may be a hardware/software link to a storage device which would store the encoded video data. The transmitter (440) may merge coded video data from the video coder (403) with other data to be transmitted, for example, coded audio data and/or ancillary data streams (sources not shown).

The controller (450) may manage operation of the video encoder (403). During coding, the controller (450) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (403) may perform coding operations according to a predetermined video coding technology or standard, such as ITU-T Rec. H.265. In its operation, the video encoder (403) may perform various compression operations, including predictive coding operations that exploit temporal and spatial redundancies in the input video sequence. The coded video data, therefore, may conform to a syntax specified by the video coding technology or standard being used.

In an embodiment, the transmitter (440) may transmit additional data with the encoded video. The source coder (430) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTUs) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 5:
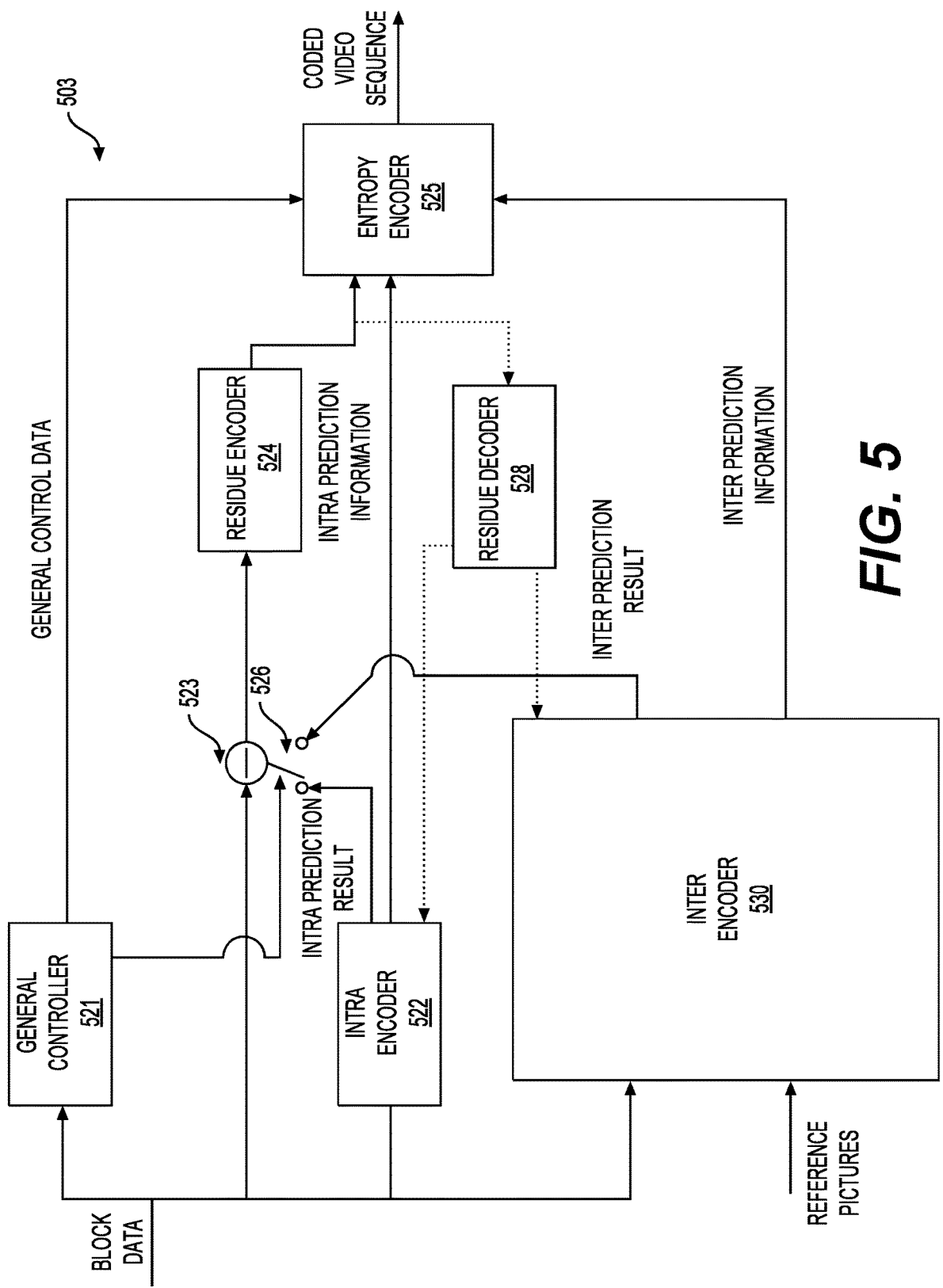
FIG. 5 shows a block diagram of an encoder in accordance with another embodiment.

FIG. 5 shows a diagram of a video encoder (503) according to another embodiment of the disclosure. The video encoder (503) is configured to receive a processing block (e.g., a prediction block) of sample values within a current video picture in a sequence of video pictures, and encode the processing block into a coded picture that is part of a coded video sequence. In an example, the video encoder (503) is used in the place of the video encoder (203) in the FIG. 2 example.

In an HEVC example, the video encoder (503) receives a matrix of sample values for a processing block, such as a prediction block of 8×8 samples, and the like. The video encoder (503) determines whether the processing block is best coded using intra mode, inter mode, or bi-prediction mode using, for example, rate-distortion optimization. When the processing block is to be coded in intra mode, the video encoder (503) may use an intra prediction technique to encode the processing block into the coded picture; and when the processing block is to be coded in inter mode or bi-prediction mode, the video encoder (503) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (503) includes other components, such as a mode decision module (not shown) to determine the mode of the processing blocks.

In the FIG. 5 example, the video encoder (503) includes the inter encoder (530), an intra encoder (522), a residue calculator (523), a switch (526), a residue encoder (524), a general controller (521), and an entropy encoder (525) coupled together as shown in FIG. 5.

The inter encoder (530) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (522) is configured to receive the samples of the current block (e.g., a processing block), in some cases compare the block to blocks already coded in the same picture, generate quantized coefficients after transform, and in some cases also intra prediction information (e.g., an intra prediction direction information according to one or more intra encoding techniques). In an example, the intra encoder (522) also calculates intra prediction results (e.g., predicted block) based on the intra prediction information and reference blocks in the same picture.

The general controller (521) is configured to determine general control data and control other components of the video encoder (503) based on the general control data. In an example, the general controller (521) determines the mode of the block, and provides a control signal to the switch (526) based on the mode. For example, when the mode is the intra mode, the general controller (521) controls the switch (526) to select the intra mode result for use by the residue calculator (523), and controls the entropy encoder (525) to select the intra prediction information and include the intra prediction information in the bitstream; and when the mode is the inter mode, the general controller (521) controls the switch (526) to select the inter prediction result for use by the residue calculator (523), and controls the entropy encoder (525) to select the inter prediction information and include the inter prediction information in the bitstream.

The residue calculator (523) is configured to calculate a difference (residue data) between the received block and prediction results selected from the intra encoder (522) or the inter encoder (530). The residue encoder (524) is configured to operate based on the residue data to encode the residue data to generate the transform coefficients. In an example, the residue encoder (524) is configured to convert the residue data from a spatial domain to a frequency domain, and generate the transform coefficients. The transform coefficients are then subject to quantization processing to obtain quantized transform coefficients. In various embodiments, the video encoder (503) also includes a residue decoder (528). The residue decoder (528) is configured to perform inverse-transform, and generate the decoded residue data. The decoded residue data can be suitably used by the intra encoder (522) and the inter encoder (530). For example, the inter encoder (530) can generate decoded blocks based on the decoded residue data and inter prediction information, and the intra encoder (522) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (525) is configured to format the bitstream to include the encoded block. The entropy encoder (525) is configured to include various information according to a suitable standard, such as the HEVC standard. In an example, the entropy encoder (525) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 6:
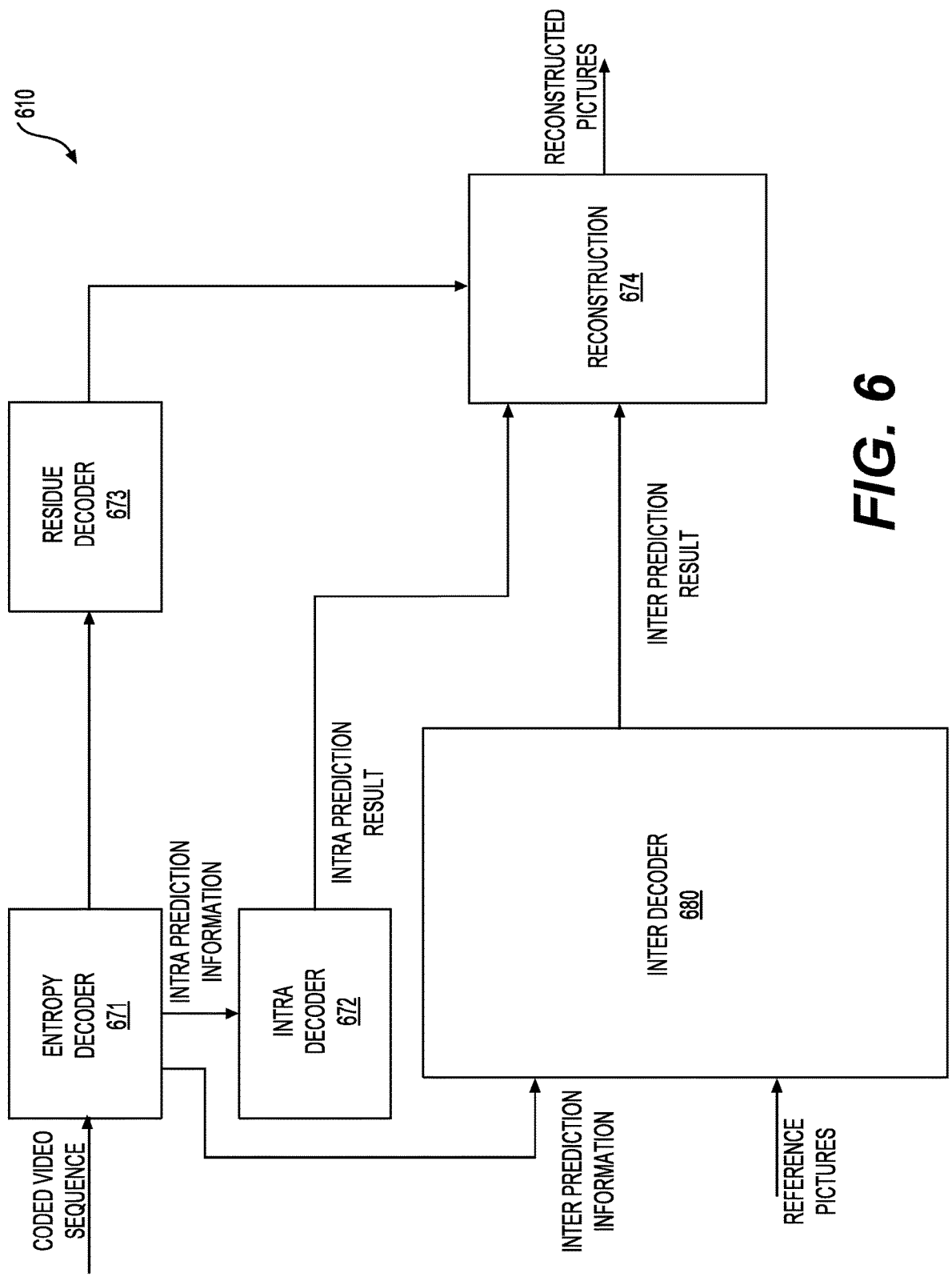
FIG. 6 shows a block diagram of a decoder in accordance with another embodiment.

FIG. 6 shows a diagram of a video decoder (610) according to another embodiment of the disclosure. The video decoder (610) is configured to receive coded pictures that are part of a coded video sequence, and decode the coded pictures to generate reconstructed pictures. In an example, the video decoder (610) is used in the place of the video decoder (210) in the FIG. 2 example.

In the FIG. 6 example, the video decoder (610) includes an entropy decoder (671), an inter decoder (680), a residue decoder (673), a reconstruction module (674), and an intra decoder (672) coupled together as shown in FIG. 6.

The entropy decoder (671) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode), prediction information (such as, for example, intra prediction information or inter prediction information) that can identify certain sample or metadata that is used for prediction by the intra decoder (672) or the inter decoder (680), respectively, residual information in the form of, for example, quantized transform coefficients, and the like. In an example, when the prediction mode is inter or bi-predicted mode, the inter prediction information is provided to the inter decoder (680); and when the prediction type is the intra prediction type, the intra prediction information is provided to the intra decoder (672). The residual information can be subject to inverse quantization and is provided to the residue decoder (673).

The inter decoder (680) is configured to receive the inter prediction information, and generate inter prediction results based on the inter prediction information.

The intra decoder (672) is configured to receive the intra prediction information, and generate prediction results based on the intra prediction information.

The residue decoder (673) is configured to perform inverse quantization to extract de-quantized transform coefficients, and process the de-quantized transform coefficients to convert the residual from the frequency domain to the spatial domain. The residue decoder (673) may also require certain control information (to include the Quantizer Parameter (QP)), and that information may be provided by the entropy decoder (671) (data path not depicted as this may be low volume control information only).

The reconstruction module (674) is configured to combine, in the spatial domain, the residual as output by the residue decoder (673) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (203), (403), and (503), and the video decoders (210), (310), and (610) can be implemented using any suitable technique. In an embodiment, the video encoders (203), (403), and (503), and the video decoders (210), (310), and (610) can be implemented using one or more integrated circuits. In another embodiment, the video encoders (203), (403), and (403), and the video decoders (210), (310), and (610) can be implemented using one or more processors that execute software instructions.

Aspects of the disclosure provide techniques for coupling CTU size with maximum TU size. Specifically, in some embodiments, the disclosure provides schemes for controlling maximum transform unit size, and for controlling the interaction between maximum transform unit size and transform partitioning schemes (e.g., sub-block transform (SBT) and intra sub partitioning (ISP)).

A block partitioning structure is referred to as a coding tree. In some embodiments, by using a quadtree structure, a coding tree unit (CTU) is split into coding units (CUs) to adapt to various local characteristics. A decision on whether to code a picture area using an inter-picture (temporal) or intra-picture (spatial) prediction is made at CU level. Each CU can be further split into one, two, or four prediction units (PUs) according to a PU splitting type. Inside one PU, a same prediction process is applied and relevant information is transmitted to a decoder on a PU basis.

After obtaining a residual block by applying a prediction process based on the PU splitting type, a CU can be partitioned into transform units (TUs) according to another quadtree structure. As can be seen, there are multiple partition conceptions including CU, PU, and TU. In some embodiments, a CU or a TU can only be square shape, while a PU may be square or rectangular shape. In some embodiments, one coding block may be further split into four square sub-blocks, and transform is performed on each sub-block, i.e., TU. Each TU can be further split recursively into smaller Tus using a quadtree structure which is called residual quadtree (RQT).

At a picture boundary, in some embodiments, implicit quadtree split can be employed so that a block will keep quad-tree splitting until the size fits the picture boundary.

In some embodiments, a quadtree plus binary tree (QTBT) structure is employed. The QTBT structure removes the concepts of multiple partition types (the CU, PU and TU concepts), and supports more flexibility for CU partition shapes. In the QTBT block structure, a CU can have either a square or rectangular shape.

Figure 7A:
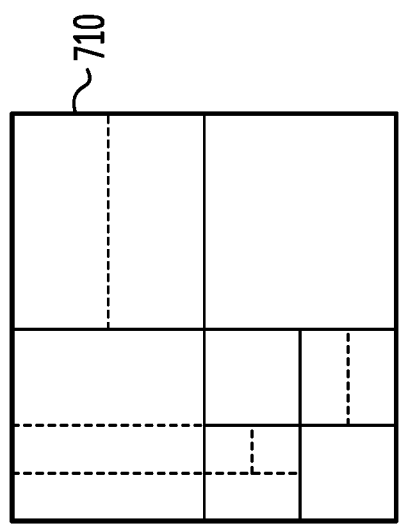
FIGS. 7A-7B show an example of CTU partition.
Figure 7B:
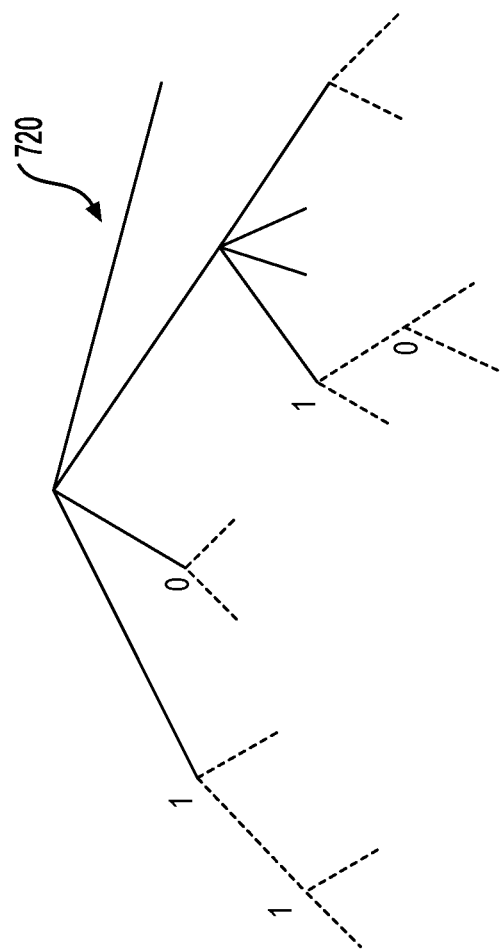

FIG. 7A shows a CTU (710) that is partitioned by using a QTBT structure (720) shown in FIG. 7B. The CTU (710) is first partitioned by a quadtree structure. The quadtree leaf nodes are further partitioned by a binary tree structure or a quadtree structure. There can be two splitting types, symmetric horizontal splitting and symmetric vertical splitting, in the binary tree splitting. The binary tree leaf nodes are called CUs that can be used for prediction and transform processing without any further partitioning. Accordingly, CU, PU and TU have the same block size in the QTBT coding block structure.

In some embodiments, a CU can include coding blocks (CBs) of different color components. For example, one CU contains one luma CB and two chroma CBs in the case of P and B slices of the 4:2:0 chroma format. A CU can include a CB of a single color component. For example, one CU contains only one luma CB or just two chroma CBs in the case of I slices.

Some parameters are defined for the QTBT partitioning scheme in some embodiments. The parameters include CTU size, MinQTSize, MaxBTSize, MaxBTDepth and MinBTSize. CTU size defines the root node size of a quadtree, e.g. the same concept as in HEVC. MinQTSize is the minimum allowed quadtree leaf node size. MaxBTSize is the maximum allowed binary tree root node size. MaxBTDepth is the maximum allowed binary tree depth. MinBTSize is the minimum allowed binary tree leaf node size.

In an example of the QTBT partitioning structure, the CTU size is set as 128×128 luma samples with two corresponding 64×64 blocks of chroma samples, the MinQTSize is set as 16×16, the MaxBTSize is set as 64×64, the MinBTSize (for both width and height) is set as 4×4, and the MaxBTDepth is set as 4. The quadtree partitioning is applied to the CTU first to generate quadtree leaf nodes. The quadtree leaf nodes may have a size from 16×16 (i.e., the MinQTSize) to 128×128 (i.e., the CTU size). If the leaf quadtree node is 128×128, it will not be further split by the binary tree since the size exceeds the MaxBTSize (i.e., 64×64). Otherwise, the leaf quadtree node could be further partitioned by the binary tree. Therefore, the quadtree leaf node is also the root node for the binary tree and it has the binary tree depth as 0.

When the binary tree depth reaches MaxBTDepth (i.e., 4), no further splitting is considered. When the binary tree node has width equal to MinBTSize (i.e., 4), no further horizontal splitting is considered. Similarly, when the binary tree node has height equal to MinBTSize, no further vertical splitting is considered. The leaf nodes of the binary tree are further processed by prediction and transform processing without any further partitioning. In an embodiment, a maximum CTU size is 256×256 luma samples.

In FIGS. 7A and 7B, the solid lines indicate quadtree splitting and dotted lines indicate binary tree splitting. In each splitting (i.e., non-leaf) node of the binary tree, one flag is signaled to indicate which splitting type (i.e., horizontal or vertical) is used. For example, 0 indicates a horizontal splitting and 1 indicates a vertical splitting. For the quadtree splitting, there is no need to indicate the splitting type since quadtree splitting always splits a block both horizontally and vertically to produce 4 sub-blocks with an equal size.

In some embodiments, the QTBT scheme supports the flexibility for the luma and chroma to have a separate QTBT structure. For example, for P and B slices, the luma and chroma blocks in one CTU share the same QTBT structure. However, for I slices, the luma CTB is partitioned into CUs by a QTBT structure, and the chroma blocks are partitioned into chroma CUs by another QTBT structure. Thus, a CU in an I slice consists of a coding block of the luma component or coding blocks of two chroma components, and a CU in a P or B slice consists of coding blocks of all three color components.

In some embodiments, inter prediction for small blocks is restricted to reduce memory access of motion compensation. For example, bi-prediction is not supported for 4×8 and 8×4 blocks, and inter prediction is not supported for 4×4 blocks.

In some embodiments, a multi-type-tree (MTT) structure is used for partitioning a picture. The MTT structure is a more flexible tree structure than the QTBT structure. In MTT, in addition to quad-tree and binary-tree, horizontal center-side triple-tree and vertical center-side triple-tree are employed.

Figure 8B:
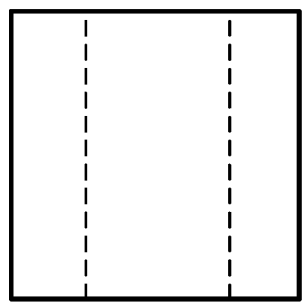
FIGS. 8A-8B show examples of triple tree partition.
Figure 8A:
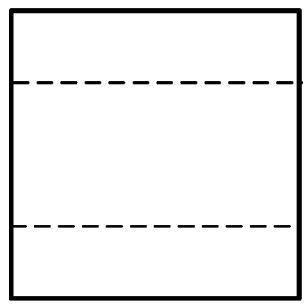

FIG. 8A shows an example of vertical center side triple tree partition. The vertical center side triple tree partition split a block vertically into three smaller blocks. The center block is twice the size of each of the side blocks.

FIG. 8B shows an example of horizontal center-side triple-tree partition. The horizontal center-side triple tree partition split a block horizontally into three smaller blocks. The center block is twice the size of each of the side blocks.

Triple tree partitioning can complement quad-tree and binary-tree partitioning. For example, triple-tree partitioning is able to capture objects which locate in a block center, while quad-tree and binary-tree splits crossing block centers. The width and height of partitions by triple trees are a power of 2 so that no additional transform partition is needed.

According to some aspects of the disclosure, primary and secondary transforms can be used in the coding of residual signals. In some embodiments, 4-point, 8-point, 16-point and 32-point type 2 discrete cosine transform (DCT-2) transforms can be used as primary transform. FIGS. 9-12 show transform core matrices of 4-point, 8-point, 16-point, and 32-point DCT-2, respectively. Elements of those transform core matrices can be represented using 8-bit integers, and thus those transform core matrices are referred to as 8-bit transform cores. As shown, the transform core matrix of a smaller DCT-2 is a part of that of a larger DCT-2.

The DCT-2 core matrices show symmetry/anti-symmetry characteristics. Accordingly, a so-called "partial butterfly" implementation can be supported to reduce the number of operation counts (multiplications, adds/subs, shifts). Identical results of matrix multiplication can be obtained using the partial butterfly implementation.

In some embodiments, in addition to 4-point, 8-point, 16-point and 32-point DCT-2 transforms described above, additional 2-point and 64-point DCT-2 are used. FIGS. 13A-13E show a 64×64 transform core matrix of the 64-point DCT-2 transform.

In some embodiments, in addition to DCT-2 and 4×4 discrete sine transform type IIV (DST-7) transforms, an adaptive multiple transform (AMT) (also known as enhanced multiple transform (EMT), or multiple transform selection (MTS)) is used for residual coding of both inter and intra coded blocks. The AMT uses multiple selected transforms from discrete cosine transform (DCT)/discrete sine transform (DST) families in addition to DCT-2 transforms, such as transform core matrices of DST-7, or DCT-8 transform.

FIG. 14 shows transform basis functions of the selected DST/DCT transforms.

In some embodiments, the DST/DCT transform core matrices used in AMT are represented with 8-bit representation. In some embodiments, AMT is applied to CUs with both width and height smaller than or equal to 32. Whether to apply AMT or not can be controlled by a flag denoted by mts_flag. For example, when the mts_flag is equal to 0, only DCT-2 is applied to coding a residue block. When the mts_flag is equal to 1, an index, denoted by mts_idx, can further be signaled using 2 bins to specify a horizontal and vertical transforms to be used.

FIG. 15 shows a table (1500) illustrating a mapping relationship between an mts_idx value and respective horizontal or vertical transforms. The row (1501) with the mts_idx having a value of −1 corresponds to the scenario where the mts_flag is equal to 0, and DCT-2 transform is used. The rows (1502)-(1505) with the mts_idx having a value of 0, 1, 2, or 3 correspond to the scenario where the mts_flag is equal to 1. In the right two columns of the table (1500), 0 represents a transform type of DCT-2, 1 represents a transform type of DST-7, and 2 represents a transform type of DCT 8.

FIGS. 16-19 show transform core matrices of DST-7 transform. FIGS. 20-23 show transform core matrices of DCT-8 transform.

In some examples, such as in VVC, when both the height and width of the coding block is smaller than or equal to 64, the transform size is the same as the coding block size. When either the height or width of the coding block is larger than 64, when doing a transform (such as an inverse transform, an inverse primary transform, or the like) or intra prediction, the coding block is further split into multiple sub-blocks, where the width and height of each sub-block is smaller than or equal to 64. One transform can be performed on each sub-block.

Figure 25:
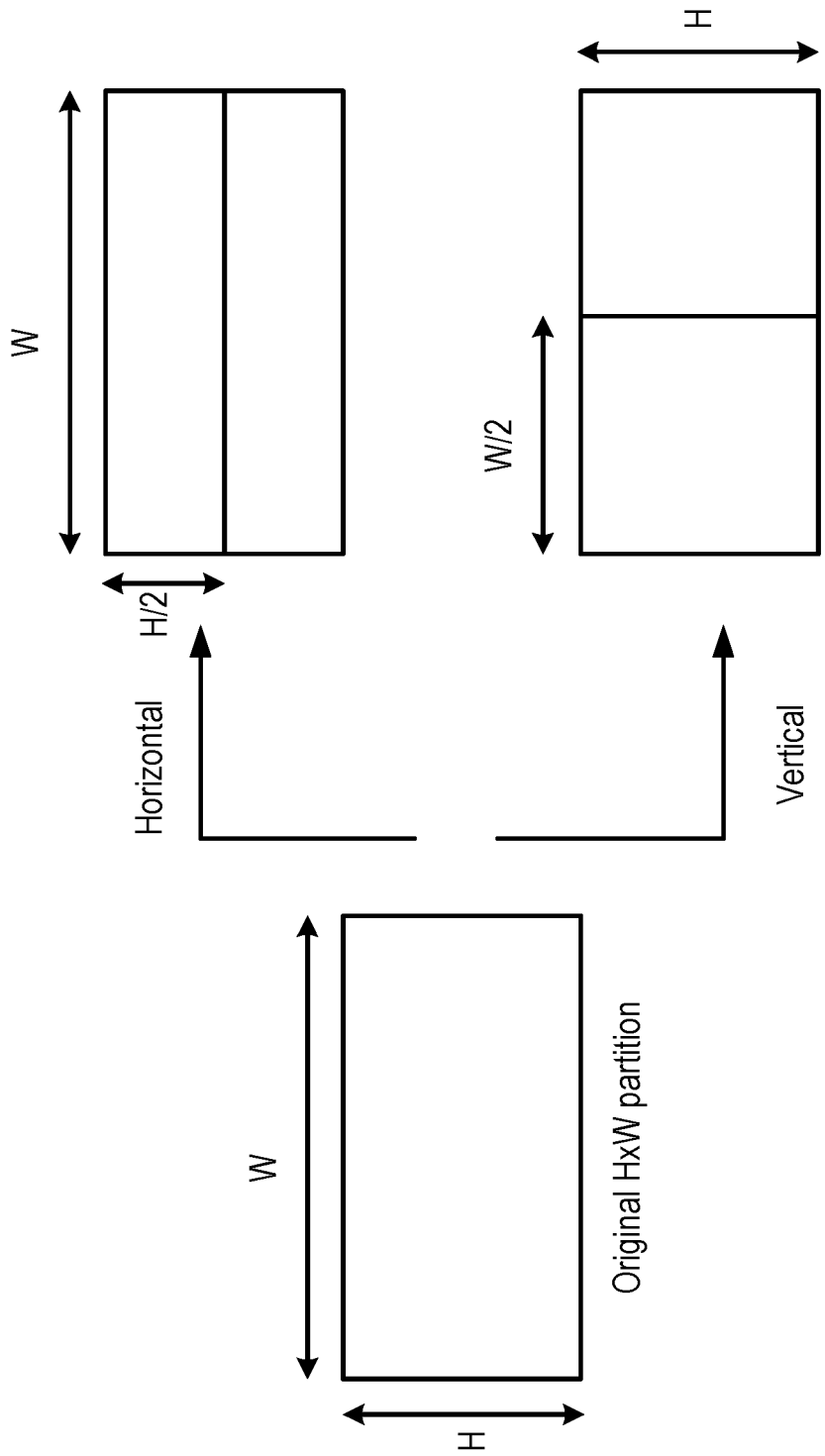
FIG. 25 shows the scenario where a block is partitioned into two sub-partitions.
Figure 26:
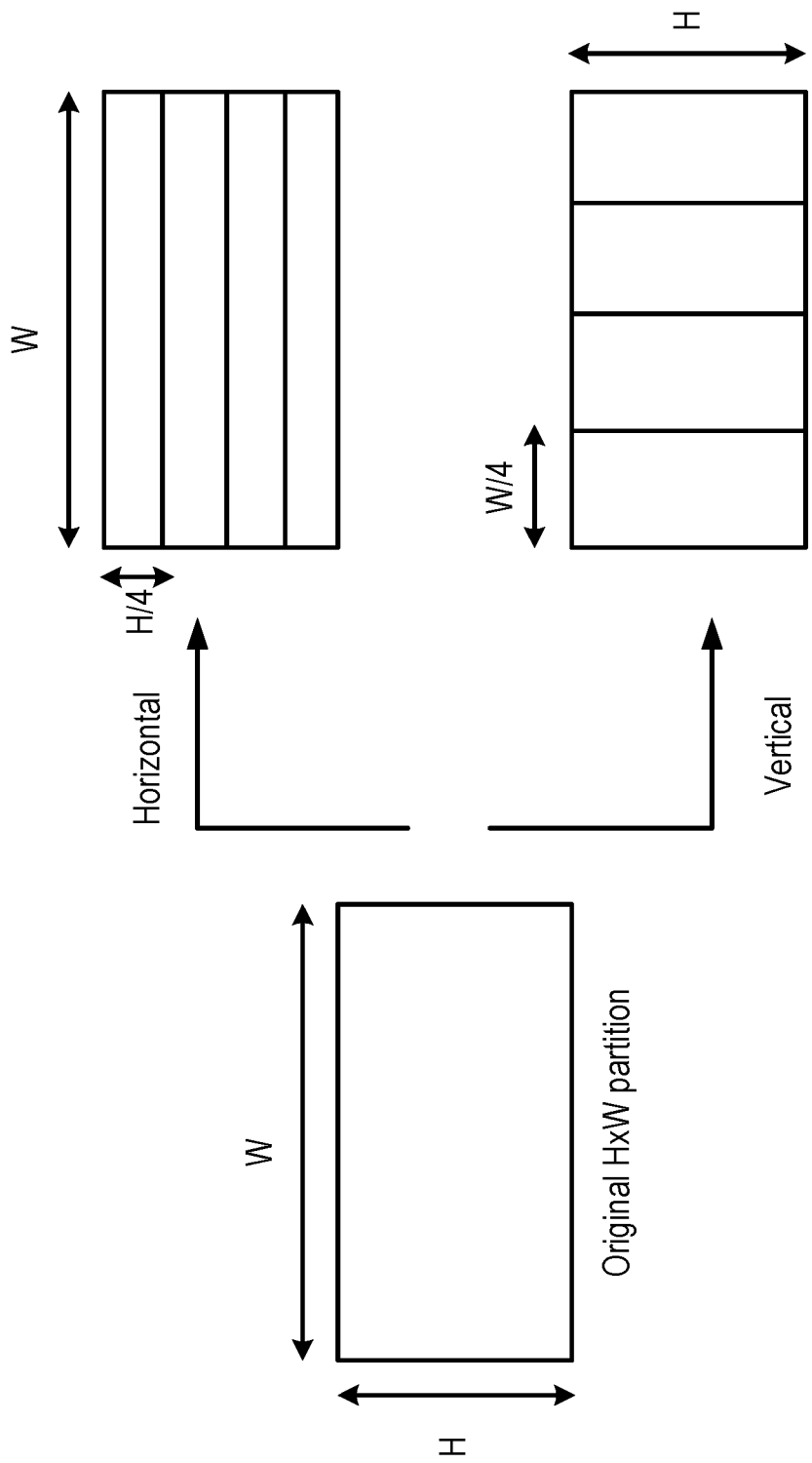
FIG. 26 shows the scenario where a block is partitioned into four sub-partitions.
Figure 28A:
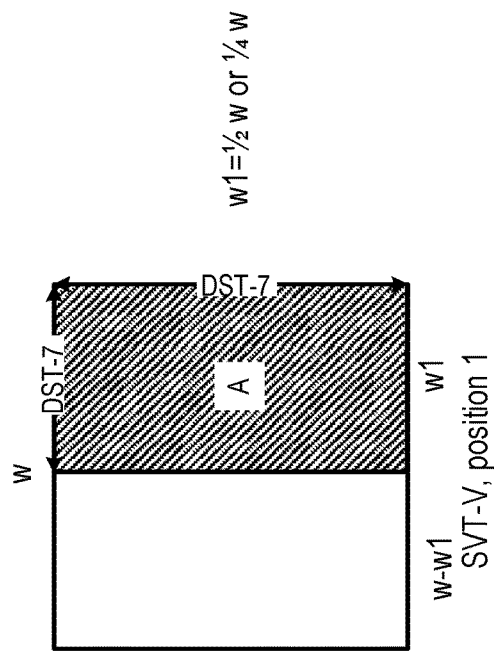
FIGS. 28A-28D show examples of sub-block transform (SBT).
Figure 28B:
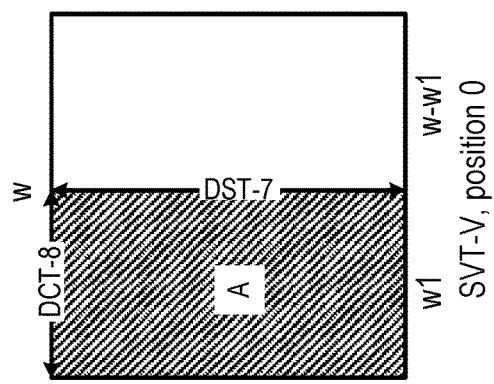
Figure 28C:
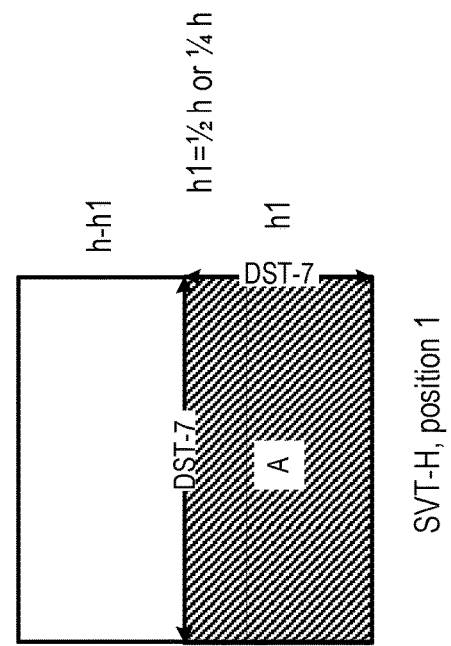
Figure 28D:
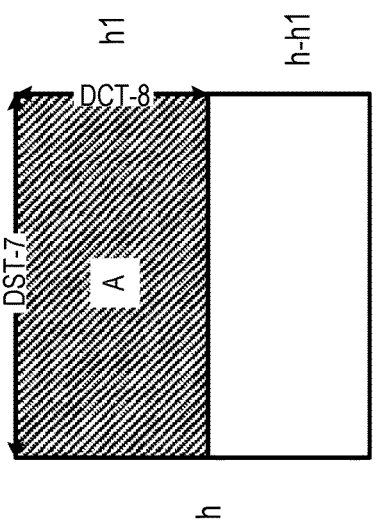

In some embodiments, an intra sub-partition (ISP) coding mode is employed. In ISP coding mode, a luma intra-predicted block can be partitioned vertically or horizontally into 2 or 4 sub-partitions. The number of sub-partitions can depend on a size of the block. FIG. 24 shows the number of sub-partitions depending on the block size. FIG. 25 shows the scenario where a block is partitioned into two sub-partitions. FIG. 26 shows the scenario where a block is partitioned into four sub-partitions. In an example, all sub-partitions fulfill a condition of having at least 16 samples. In an example, ISP is not applied to chroma components.

In an example, for each of sub-partitions partitioned from a coding block, a residual signal is generated by entropy decoding respective coefficients sent from an encoder and then inverse quantizing and inverse transforming them. Then, a first one of the sub-partitions is intra predicted to generate a prediction signal. The prediction signal is added to the respective residual signal of the first sub-partition to obtain corresponding reconstructed samples. Thereafter, the reconstructed sample values of the first sub-partition can be available to generate a prediction of a second one of the sub-partitions. This process can be repeated sub-partition by sub-partition, until all sub-partitions from the coding block are reconstructed. In an example, all the sub-partitions share a same intra mode.

In an embodiment, the ISP coding mode is only tested with intra modes that are part of a most probable mode (MPM) list. Accordingly, if a block uses ISP, then a MPM flag can be inferred to be one. In addition, when ISP is used for a certain block, then a respective MPM list will be modified to exclude DC mode and to prioritize horizontal intra modes for the ISP horizontal split and vertical intra modes for the vertical one.

In ISP coding mode, each sub-partition can be regarded as a sub-TU, since the transform and reconstruction is performed individually for each sub-partition.

FIGS. 27A-27B show an example syntax table (2700) that includes related syntax elements signaled for an ISP coding mode. As shown in the portion (2710), a syntax element, intra_subpartitions_mode_flag, indicates whether ISP is used or not. A syntax element, intra_subpartitions_split_flag, indicates a partition direction (vertical or horizontal).

In some embodiments, a sub-block transform (SBT), also referred to as spatially varying transform (SVT), is employed. The SBT can be applied to inter prediction residuals. For example, in a coding block, only a portion of the coding block is treated as a residual block, and transform is applied to the portion of the coding block. Zero residual is assumed for the remaining portion of the coding block. Therefore, the residual block is smaller than the coding block, and a transform size in SBT is smaller than the coding block size. For the region which is not covered by the residual block, no transform processing is performed.

FIGS. 28A-28D show sub-block types (SVT-H, SVT-V) (e.g., vertically or horizontally partitioned), sizes and positions (e.g., left half, left quarter, right half, right quarter, top half, top quarter, bottom half, bottom quarter) supported in SBT. The shaded regions labeled by letter "A" is residual blocks with transform, and the other regions is assumed to be zero residual without transform.

As an example, FIGS. 29A-29I show changes to a specification text of a video coding standard (e.g., VVC) being developed by the Joint Video Experts Team (JVET) when SBT is used. The added texts are shown in frames from (2901) to (2913). As shown, additional syntax elements, cu_sbt_flag, cu_sbt_quad_flag, cu_sbt_horizontal_flag, and cu_sbt_pos_flag, are signaled to indicate the sub-block type (horizontal or vertical), size (half or quarter) and position (left or right, top or bottom), respectively.

Figure 30:
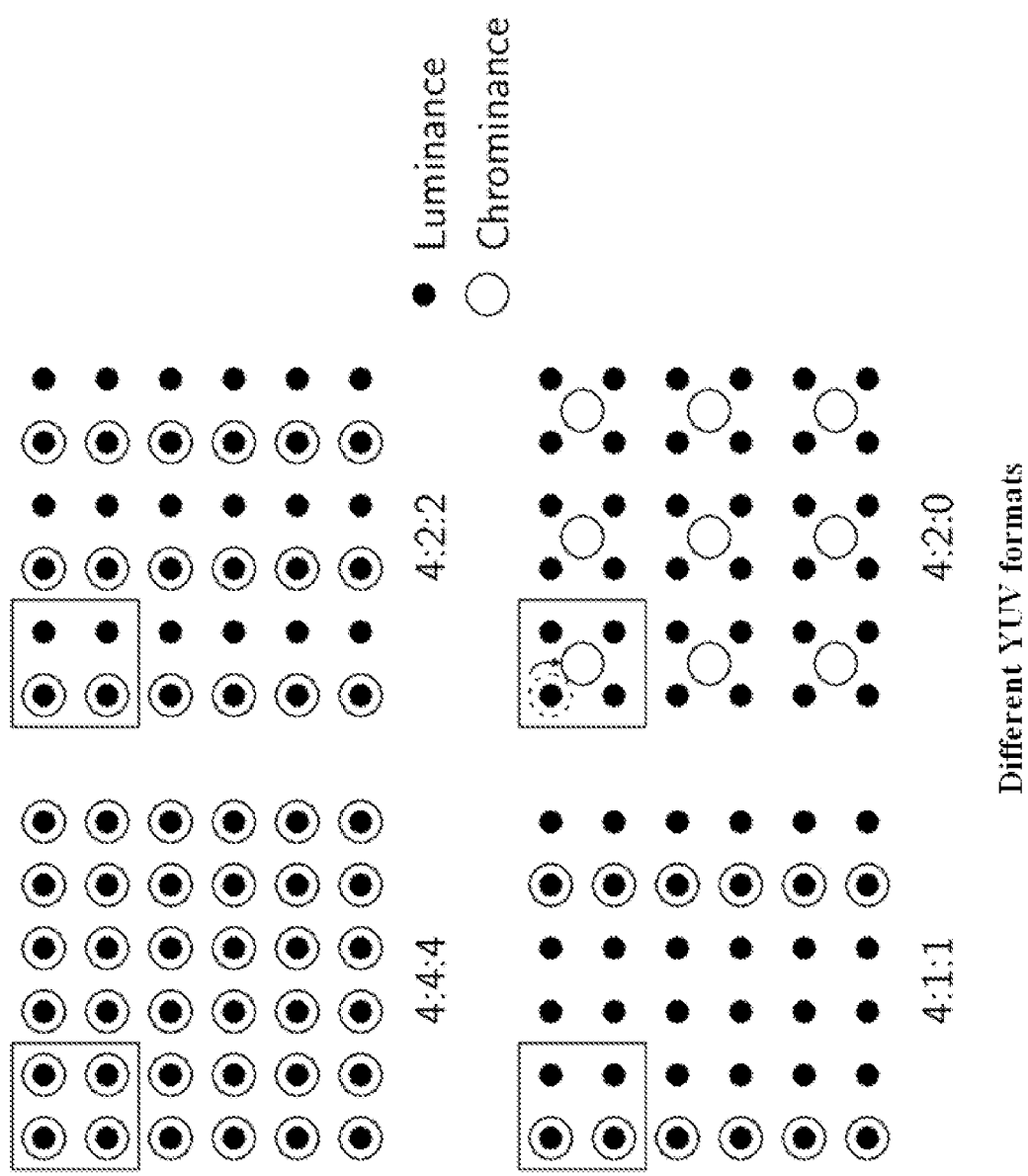
FIG. 30 shows different YUV formats used in some embodiments.

FIG. 30 shows different YUV formats (e.g., 4:4:4, 4:2:2, 4:1:1, and 4:2:0) used in some embodiments. In an example, a cross component linear model intra prediction is used for the 4:2:0 format. A six-tap interpolation filter can be applied to obtain a down-sampled luma sample corresponding to a chroma sample as shown in FIG. 30. In a formula way, a down-sampled luma sample $Rec_L[x, y]$ can be calculated from nearby reconstructed luma samples (represented by $Rec_L[x, y]$) according to (Eq. 1):

$$Rec'_L[x,y]=(2\times Rec_L[2x,2y]+2\times Rec_L[2x,2y+1]+Rec_L[2x-1,2y]+Rec_L[2x+1,2y]+Rec_L[2x-1,2y+1]+Rec_L[2x+1,2y+1]+4)>>3 \quad (Eq.\ 1)$$

According to some aspects of the disclosure, the maximum TU size may have interaction with other coding techniques and may conflict with requirements in the some coding tools. Generally, a CU may be partitioned into TUs based on maximum TU size.

In some examples, such as in some versions of VVC draft, the maximum TU size is a fix number 64, thus there is no control on the maximum TU size. Some encoders or decoders are implemented using pipeline architecture. The pipeline intermediate buffer size is closed related to the maximum TU size. When the maximum TU size is fixed without flexibility, the implementation of the encoders and decoders in some existing pipeline architecture hardware may be complicate. Thus, there is a requirement of controlling maximum TU size in VVC since maximum TU size has an impact on hardware complexity for encoder implementation.

In some examples, such as in some versions of VVC draft, certain coding techniques, such as SBT and ISP, can be used. The implementation of the SBT and ISP coding techniques may have dependency on the maximum TU size. The interactions between SBT, ISP and maximum TU size need to be handled. In an example, according to SBT, a SPS flag sps_sbt_max_size_64_flag is signaled to indicate whether the largest SBT size is 32 (samples) in length or 64 (sample) in length. When the SPS flag sps_sbt_max_size_64_flag is true, a sub-block for SBT may have a size of 32×64 for example. When the maximum TU size is 32, the encoder cannot handle and thus an encoder crash may be triggered.

In some examples, ISP mode is allowed for all CU sizes. However, when max transform size is set to be smaller than 64, there is a conflict whether implicit transform split or explicit transform split using ISP with signaling should be performed. For example, the maximum transform size is 16. For a 64×16 block, without ISP, the block is implicitly split into four 16×16 TUs. However, with ISP, the block may be partitioned using vertical ISP splitting, which results into same four 16×16 TUs, but using signaling.

In some examples, multiple TUs within one CU is allowed. However, when the CTU size is large, the CTU may be partitioned based on a relatively small maximum transform size, and thus the result of the partition can be a relatively large number of TUs. The large number of TUs may be not hardware implementation friendly. For example, in some implementation, up to four TUs needs to be processed within one CU. However, when the max TU size and CTU size is completely decoupled, then for a 128×128 CU and 16×16 max TU size, the total number of TUs can be 64 TUs.

The proposed methods may be used separately or combined in any order. Further, each of the methods (or embodiments), encoder, and decoder may be implemented by processing circuitry (e.g., one or more processors or one or more integrated circuits). In one example, the one or more processors execute a program that is stored in a non-transitory computer-readable medium.

In the following, the term block may be interpreted as a prediction block, a coding block, or a coding unit, i.e. CU. In this document, when saying high-level syntax element, it may refer to any of Video Parameter Set (VPS), Sequence Parameter Set (SPS), Picture Parameter Set (PPS), Slice header, Tile header, Tile group header. When saying CTU (coding tree unit, which is the largest CU size) header, it refers to syntax elements signaled for each CTU, e.g., as header information. In this document, when saying transform size, it may refer to the maximum transform width and/height, or maximum transform unit area size.

According to an aspect of the disclosure, the maximum transform size (maxTU, and is also referred to as maximum TU size) is derived based on the CTU size. In an example, the CTU size is defined as the larger one of the CTU width and CTU height, such as max(CTU_width, CTU_height). Then, the maximum transform size maxTU is determined by scaling the CTU size by a pre-defined number.

In some embodiments, the maximum TU size is derived as the CTU size divided by $2^N$, where example values of N include 1, 2, 3 or 4. For example, N is 1, then when the CTU size is 128, the maximum TU size is derived as 64; when the CTU size is 64, the maximum TU size is derived as 32; when the CTU size is 32, the maximum TU size is derived as 16. In an example, N may be predefined. In another example, N is signaled in bitstream, such as in high-level syntax.

In another embodiment, the maximum TU size is derived as the CTU size divided by the maximum allowed number of TUs inside a CTU (or CU). In some examples, for different color formats, the maximum allowed number of TUs may be different for different components. In an example, the maximum allowed number of TUs is 4 for luma component, and the maximum allowed number of TUs can be 4 or 1 for chroma component in 4:2:0 contents. In another example, maximum allowed number of TUs is 4 for luma component, and the maximum allowed number of TUs can be 2 for chroma component in 4:2:2 contents. The maximum allowed number of TUs may be predefined or signaled in bitstream, such as in high-level syntax.

According to another aspect of the disclosure, the maximum TU size in a current CU is derived based on the CU size, such as derived as the CU size scaled by a pre-defined number. In some embodiments, intra coded block and inter coded block may use different maximum TU sizes. For example, two allowable maximum TU sizes can be determined. The two allowable maximum TU sizes are referred to as maxTUintra (allowable maximum transform size for intra coded block) and maxTUinter (allowable maximum transform size for inter coded block) in an example. In some examples, the maxTUintra is limited or defined based on intra coding techniques or intra coding tools, such as ISP and the like; and the maxTU inter is limited or defined based on inter coding techniques or intra coding tools, such as SBT and the like.

In an embodiment, the maximum TU size for a current CU depends on whether the current CU is intra coded or inter coded. In an example, for intra coded CU, the maximum TU size allowed for current CU is derived as minimum between the current CU size and the value of maxTUintra. In another example, for inter coded CU, the maximum TU size allowed for current CU is derived as minimum between the current CU size and the value of maxTUinter.

In an example, the values of maxTUintra and maxTUinter can be signaled in high-level syntax.

In another example, the values of maxTUintra and maxTUinter can be derived based on the CTU size, such as scaling the CTU size by pre-defined numbers.

In another example, the maximum TU size for a current CU depends on the shape of the current CU, such as whether the current CU is square or rectangular, or the aspect ratio of current CU. In an example, for intra coded CU, the maximum TU size allowed for current CU is derived as minimum between the current CU size (width and/or height) and the value of maximum allowable TU size for intra coded CU. Thus, when the current CU is square and intra coded, the maximum TU size for the current CU is the minimum between the width and the value of maximum allowable TU size for intra coded CU. When the current CU is rectangular and intra coded, the maximum TU size for the current CU is the minimum between the value of the maximum allowable TU size for intra coded CU, and the shorter size of the width and the height.

Figure 31:
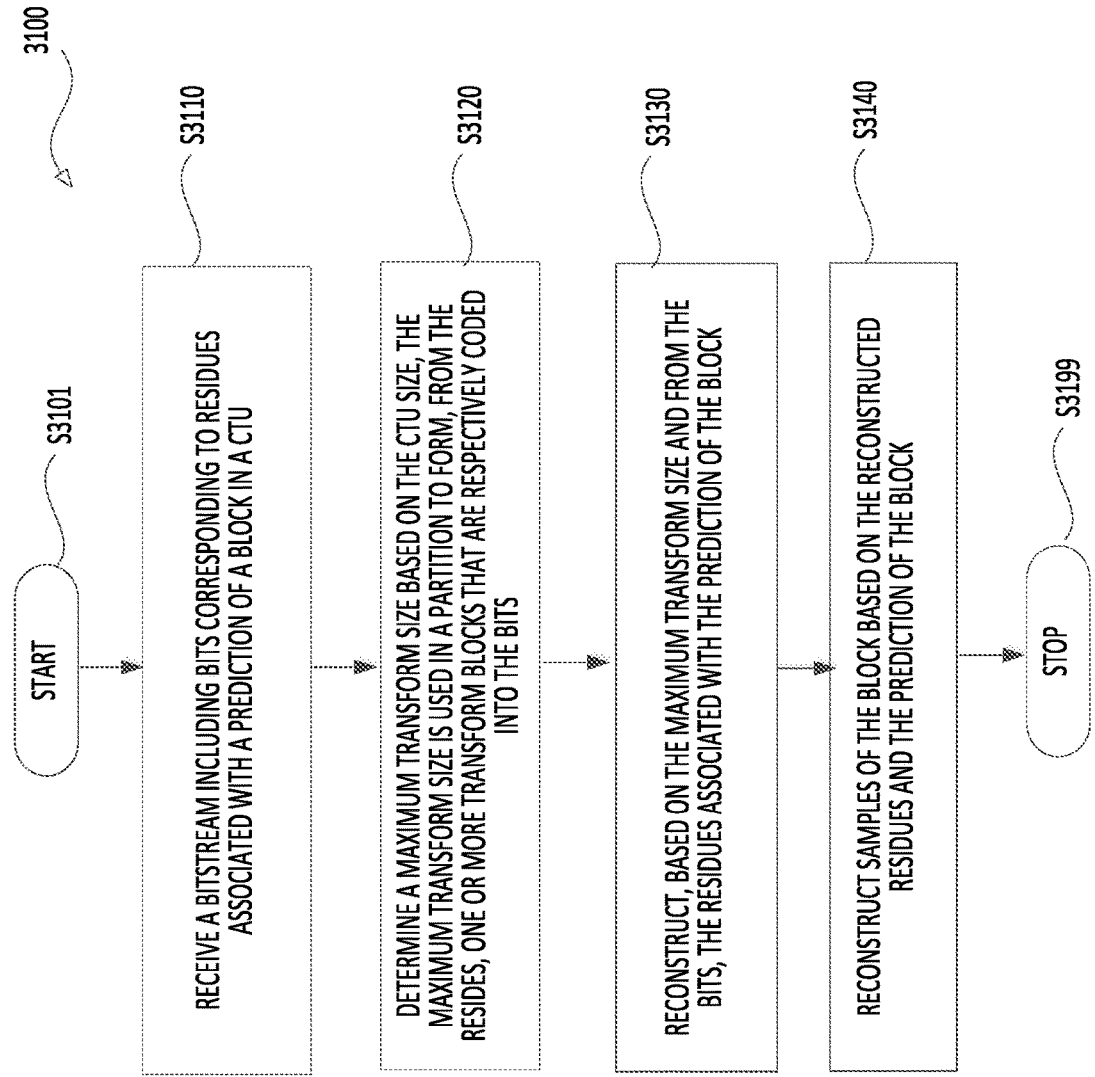
FIG. 31 is a flow chat outlining a process example according to some embodiments of the disclosure.

FIG. 31 shows a flow chart outlining a process (3100) according to an embodiment of the disclosure. The process (3100) can be used in the reconstruction of a block, so to generate a prediction block for the block under reconstruction. In various embodiments, the process (3100) are executed by processing circuitry, such as the processing circuitry in the terminal devices (110), (120), (130) and (140), the processing circuitry that performs functions of the video encoder (203), the processing circuitry that performs functions of the video decoder (210), the processing circuitry that performs functions of the video decoder (310), the processing circuitry that performs functions of the video encoder (403), and the like. In some embodiments, the process (3100) is implemented in software instructions, thus when the processing circuitry executes the software instructions, the processing circuitry performs the process (3100). The process starts at (S3101) and proceeds to (S3110).

At (3110), a bitstream is received. The bitstream includes bits corresponding to residues associated with a prediction of a block in a CTU. For example, at an encoder side, residues of a prediction block to the original block are calculated. The block of residues is partitioned into transform blocks. Transforms are applied to the transform blocks to generate coefficients. The coefficients are entropy coded into bits, thus the bits correspond to the residues associated with the prediction of the block. The bits are included into the bitstream at the encoder side.

At (3120), a maximum transform size is determined based on the CTU size. The maximum transform size is used in a partition to form, from the residues, one or more transform units that are respectively coded into the bits.

At (3130), the residues are reconstructed from the bits based on the maximum transform unit.

At (3140), samples of the block are reconstructed based on the reconstructed residues and the prediction of the block. The process proceeds to (3199) and terminates.

The techniques described above, can be implemented as computer software using computer-readable instructions and physically stored in one or more computer-readable media. For example, FIG. 32 shows a computer system (3200) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 32:
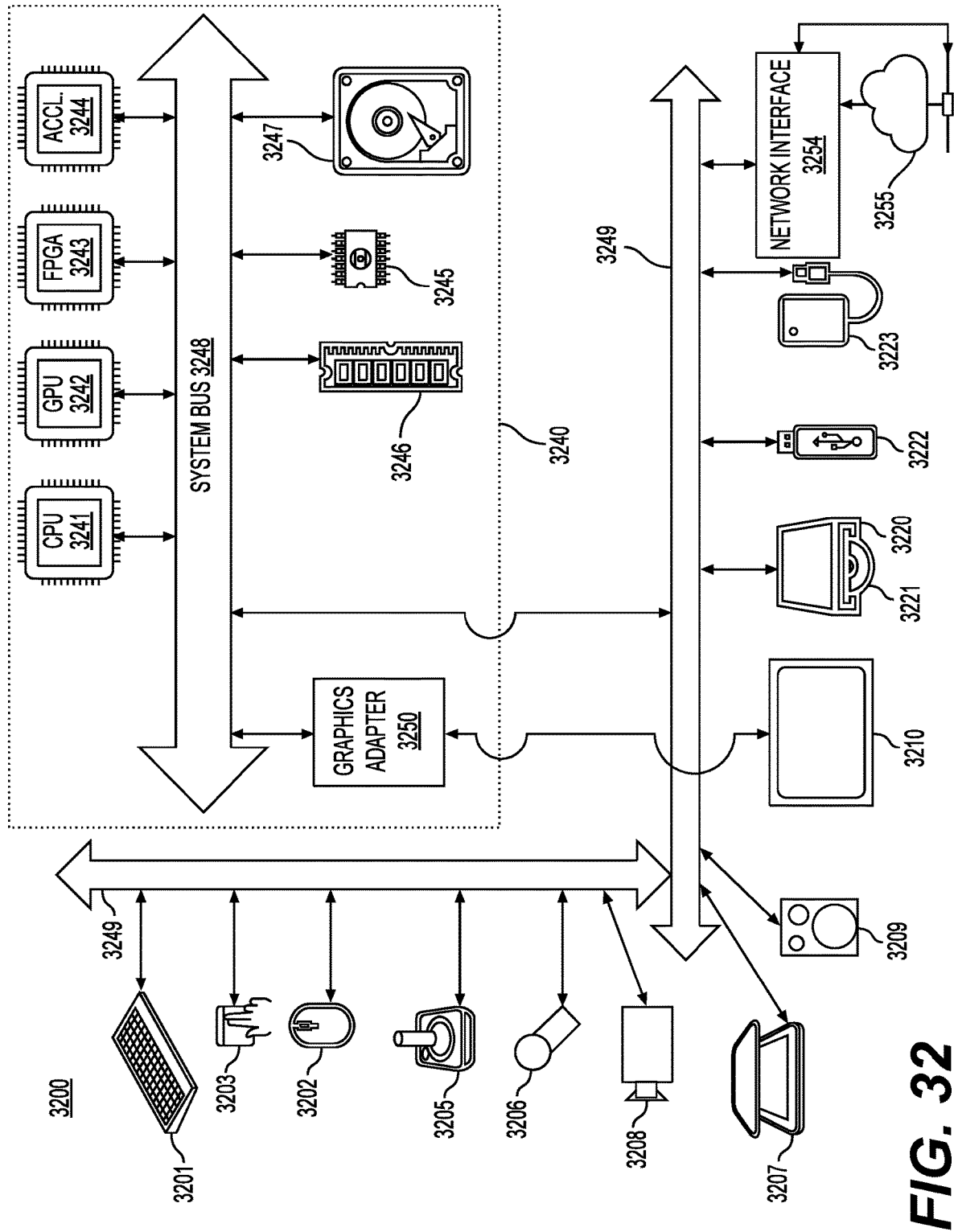
FIG. 32 is a schematic illustration of a computer system in accordance with an embodiment.

The components shown in FIG. 32 for computer system (3200) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (3200).

Computer system (3200) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (3201), mouse (3202), trackpad (3203), touch screen (3210), data-glove (not shown), joystick (3205), microphone (3206), scanner (3207), camera (3208).

Computer system (3200) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (3210), data-glove (not shown), or joystick (3205), but there can also be tactile feedback devices that do not serve as input devices), audio output devices (such as: speakers (3209), headphones (not depicted)), visual output devices (such as screens (3210) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (3200) can also include human accessible storage devices and their associated media such as optical media including CD/DVD ROM/RW (3220) with CD/DVD or the like media (3221), thumb-drive (3222), removable hard drive or solid state drive (3223), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (3200) can also include an interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (3249) (such as, for example USB ports of the computer system (3200)); others are commonly integrated into the core of the computer system (3200) by attachment to a system bus as described below (for example Ethernet interface into a PC computer system or cellular network interface into a smartphone computer system). Using any of these networks, computer system (3200) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (3240) of the computer system (3200).

The core (3240) can include one or more Central Processing Units (CPU) (3241), Graphics Processing Units (GPU) (3242), specialized programmable processing units in the form of Field Programmable Gate Areas (FPGA) (3243), hardware accelerators for certain tasks (3244), and so forth. These devices, along with Read-only memory (ROM) (3245), Random-access memory (3246), internal mass storage such as internal non-user accessible hard drives, SSDs, and the like (3247), may be connected through a system bus (3248). In some computer systems, the system bus (3248) can be accessible in the form of one or more physical plugs to enable extensions by additional CPUs, GPU, and the like. The peripheral devices can be attached either directly to the core's system bus (3248), or through a peripheral bus (3249). Architectures for a peripheral bus include PCI, USB, and the like.

CPUs (3241), GPUs (3242), FPGAs (3243), and accelerators (3244) can execute certain instructions that, in combination, can make up the aforementioned computer code. That computer code can be stored in ROM (3245) or RAM (3246). Transitional data can be also be stored in RAM (3246), whereas permanent data can be stored for example, in the internal mass storage (3247). Fast storage and retrieve to any of the memory devices can be enabled through the use of cache memory, that can be closely associated with one or more CPU (3241), GPU (3242), mass storage (3247), ROM (3245), RAM (3246), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (3200), and specifically the core (3240) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (3240) that are of non-transitory nature, such as core-internal mass storage (3247) or ROM (3245). The software implementing various embodiments of the present disclosure can be stored in such devices and executed by core (3240). A computer-readable medium can include one or more memory devices or chips, according to particular needs. The software can cause the core (3240) and specifically the processors therein (including CPU, GPU, FPGA, and the like) to execute particular processes or particular parts of particular processes described herein, including defining data structures stored in RAM (3246) and modifying such data structures according to the processes defined by the software. In addition or as an alternative, the computer system can provide functionality as a result of logic hardwired or otherwise embodied in a circuit (for example: accelerator (3244)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

APPENDIX A: ACRONYMS

JEM: joint exploration model
VVC: versatile video coding
BMS: benchmark set
MV: Motion Vector
HEVC: High Efficiency Video Coding
SEI: Supplementary Enhancement Information
VUI: Video Usability Information
GOPs: Groups of Pictures
TUs: Transform Units,
PUs: Prediction Units
CTUs: Coding Tree Units
CTBs: Coding Tree Blocks
PBs: Prediction Blocks
HRD: Hypothetical Reference Decoder
SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory
RAM: Random Access Memory
ASIC: Application-Specific Integrated Circuit
PLD: Programmable Logic Device
LAN: Local Area Network
GSM: Global System for Mobile communications
LTE: Long-Term Evolution
CANBus: Controller Area Network Bus
USB: Universal Serial Bus
PCI: Peripheral Component Interconnect
FPGA: Field Programmable Gate Areas SSD: solid-state drive
IC: Integrated Circuit
CU: Coding Unit While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for video encoding in a video encoder, comprising:
    determining, by a processor, a maximum transform size for partitioning a block in a coding tree unit (CTU) based on a size of the CTU;
    partitioning, by the processor, the block into one or more transform blocks based on the maximum transform size; and
    encoding, by the processor, residues associated with a prediction of the block into bits in a bitstream, according to the one of more transform blocks.

2. The method of claim 1, further comprising:
    scaling, by the processor, the size of the CTU by a scaling factor to determine the maximum transform size.

3. The method of claim 2, wherein the scaling factor is predetermined.

4. The method of claim 2, further comprising:
    including information indicative of the scaling factor in the bitstream.

5. The method of claim 1, further comprising:
    dividing, by the processor, the CTU size by an allowable number for transform units in the CTU to determine the maximum transform size.

6. The method of claim 1, further comprising:
    determining, by the processor, the maximum transform size, based on a size of the block.

7. The method of claim 6, further comprising:
    determining, in response to the prediction of the block being an intra prediction, the maximum transform size as a minimum size of the block and an allowable maximum transform size for intra coded blocks.

8. The method of claim 6, further comprising:
    determining, in response to the prediction of the block being an inter prediction, the maximum transform size as a minimum size of the block and an allowable maximum transform size for inter coded blocks.

9. The method of claim 6, further comprising:
    determining, by the processor, the maximum transform size based on a smaller size of a weight and a height of the block.

10. An apparatus for video encoding, comprising processing circuitry configured to:
    determine a maximum transform size for partitioning a block in a coding tree unit (CTU) based on a size of the CTU;
    partition the block into one or more transform blocks based on the maximum transform size; and
    encode residues associated with a prediction of the block into bits in a bitstream, according to the one of more transform blocks.

11. The apparatus of claim 10, wherein the processing circuitry is configured to:
    scale the size of the CTU by a scaling factor to determine the maximum transform size.

12. The apparatus of claim 11, wherein the scaling factor is predetermined.

13. The apparatus of claim 11, wherein the processing circuitry is configured to:
    include information indicative of the scaling factor in the bitstream.

14. The apparatus of claim 10, wherein the processing circuitry is configured to:
    divide the CTU size by an allowable number for transform units in the CTU to determine the maximum transform size.

15. The apparatus of claim 10, wherein the processing circuitry is configured to:
    determine the maximum transform size, based on a size of block.

16. The apparatus of claim 15, wherein the processing circuitry is configured to
    determine, in response to the prediction of the block being an intra prediction, the maximum transform size as a minimum size of the block and an allowable maximum transform size for intra coded blocks.

17. The apparatus of claim 15, wherein the processing circuitry is configured to:
    determine, in response to the prediction of the block being an inter prediction, the maximum transform size as a minimum size of the block and an allowable maximum transform size for inter coded blocks.

18. The apparatus of claim 15, wherein the processing circuitry is configured to:
    determine the maximum transform size based on a smaller size of a weight and a height of the block.

19. A non-transitory computer-readable medium storing instructions which when executed by a computer for video encoding cause the computer to perform:
    determining a maximum transform size for partitioning a block in a coding tree unit (CTU) based on a size of the CTU;
    partitioning the block into one or more transform blocks based on the maximum transform size; and
    encoding residues associated with a prediction of the block into bits in a bitstream, according to the one of more transform blocks.

20. The non-transitory computer-readable medium of claim 19, wherein the instructions further cause the computer to perform:
    scaling the CTU size by a scaling factor to determine the maximum transform size.

* * * * *